US012657262B2

(12) United States Patent
Chengalvala et al.

(10) Patent No.: US 12,657,262 B2
(45) Date of Patent: Jun. 16, 2026

(54) GEN AI-BASED IMPROVED END-TO-END DATA ANALYTICS TOOL

(71) Applicant: Cognizant Technology Solutions India Pvt. Ltd., Chennai (IN)

(72) Inventors: Chandra Sekhar Chengalvala, Hyderabad (IN); Sivakumar Deivacikamani, Coimbatore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 18/999,214

(22) Filed: Dec. 23, 2024

(65) Prior Publication Data

US 2025/0209138 A1     Jun. 26, 2025

(51) Int. Cl.
| | |
|---|---|
| *G06F 18/00* | (2023.01) |
| *G06F 18/26* | (2023.01) |
| *G06F 40/40* | (2020.01) |
| *G06N 3/0475* | (2023.01) |
| *G06N 3/0985* | (2023.01) |

(52) U.S. Cl.
CPC .............. *G06F 18/26* (2023.01); *G06F 40/40* (2020.01); *G06N 3/0475* (2023.01); *G06N 3/0985* (2023.01)

(58) Field of Classification Search
None
See application file for complete search history.

(56) References Cited

U.S. PATENT DOCUMENTS

| | | |
|---|---|---|
| 11,574,150 B1 | 2/2023 | Sharma et al. |
| 11,875,123 B1 | 1/2024 | Ben David et al. |

(Continued)

OTHER PUBLICATIONS

Wu, T., Terry, M., & Cai, C. J. (Apr. 2022). Ai chains: Transparent and controllable human-ai interaction by chaining large language model prompts. In Proceedings of the 2022 CHI conference on human factors in computing systems (pp. 1-22). (Year: 2022).*

(Continued)

*Primary Examiner* — Farhan M Syed
(74) *Attorney, Agent, or Firm* — CANTOR COLBURN LLP

(57) ABSTRACT
A generative artificial intelligence-based system and method for providing an improved end-to-end data analytics tool is provided. Data from input unit(s) associated with multiple data sources located at disparate locations is collected. A data quality assessment is performed based on one or more pre-determined criteria. Transformed version of the collected data is processed for analyzing one or more data parameters associated with the transformed data to determine relationships and patterns within the transformed data. Prompts are generated related to operational issues associated with the specific domain. The prompts are provided to Large Language Models (LLMs) as input for generating diagnostic data and insights related to the operational issues. An optimized value of one or more modifiable prompt parameters associated with the generated prompts is determined for customizing the LLMs. Domain specific recommendations are provided by LLM based on the generated diagnostic data and insights for resolving the operational issues.

29 Claims, 29 Drawing Sheets

100

(56) References Cited

U.S. PATENT DOCUMENTS

| | | | |
|---|---|---|---|
| 12,265,570 B2 * | 4/2025 | Siebel ................. | G06F 16/3347 |
| 2008/0288474 A1 * | 11/2008 | Chin ................... | G06F 16/3337 |
| 2015/0193883 A1 | 7/2015 | Sullins et al. | |
| 2024/0202221 A1 * | 6/2024 | Siebel .................. | G06N 3/0475 |
| 2024/0242029 A1 * | 7/2024 | Bharadwaj .............. | G06F 40/56 |
| 2024/0403553 A1 * | 12/2024 | Chase .................. | G06F 40/211 |
| 2024/0420453 A1 * | 12/2024 | Gupta ................... | G06F 40/30 |
| 2025/0148219 A1 * | 5/2025 | Jauhar .................. | G06F 16/288 |
| 2025/0173330 A1 * | 5/2025 | Durg ................... | G06F 16/243 |
| 2025/0181899 A1 * | 6/2025 | Ajmera ............... | G06N 3/0475 |

OTHER PUBLICATIONS

John, R. J. L., Bacon, D., Chen, J., Ramesh, U., Li, J., Das, D., . . . & Patel, J. M. (Jun. 2023). Datachat: An intuitive and collaborative data analytics platform. In Companion of the 2023 International Conference on Management of Data (pp. 203-215). (Year: 2023).*
Ansel Durant, et al, Artificial Intelligence is Transforming the Insurance Industry, Introducing Innovative Methods That Revolutionize the Buying Process for Customers, Nov. 1, 2022.
Xi Yang, A large language model for electronic health records, Dec. 25, 2022.

* cited by examiner

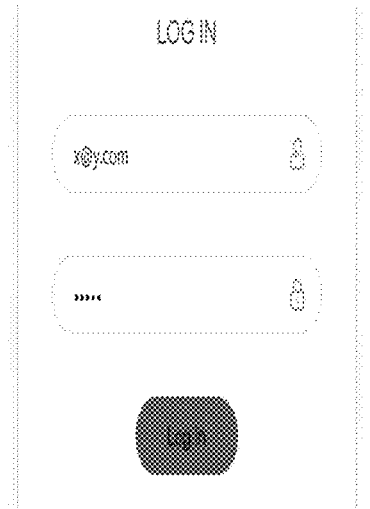
LOG IN
x@y.com
>>>>>
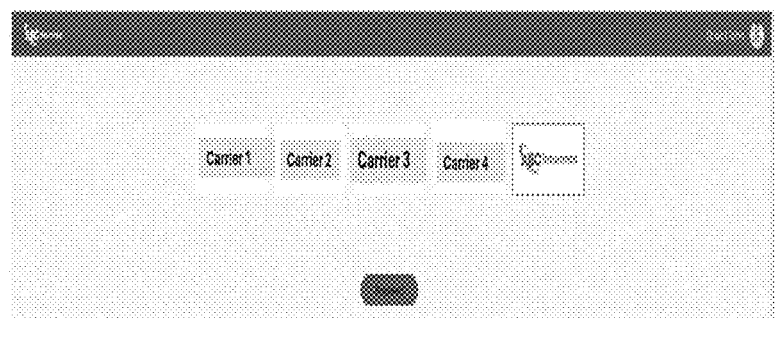
Carrier 1    Carrier 2    Carrier 3    Carrier 4
FIG. 2
FIG. 2A

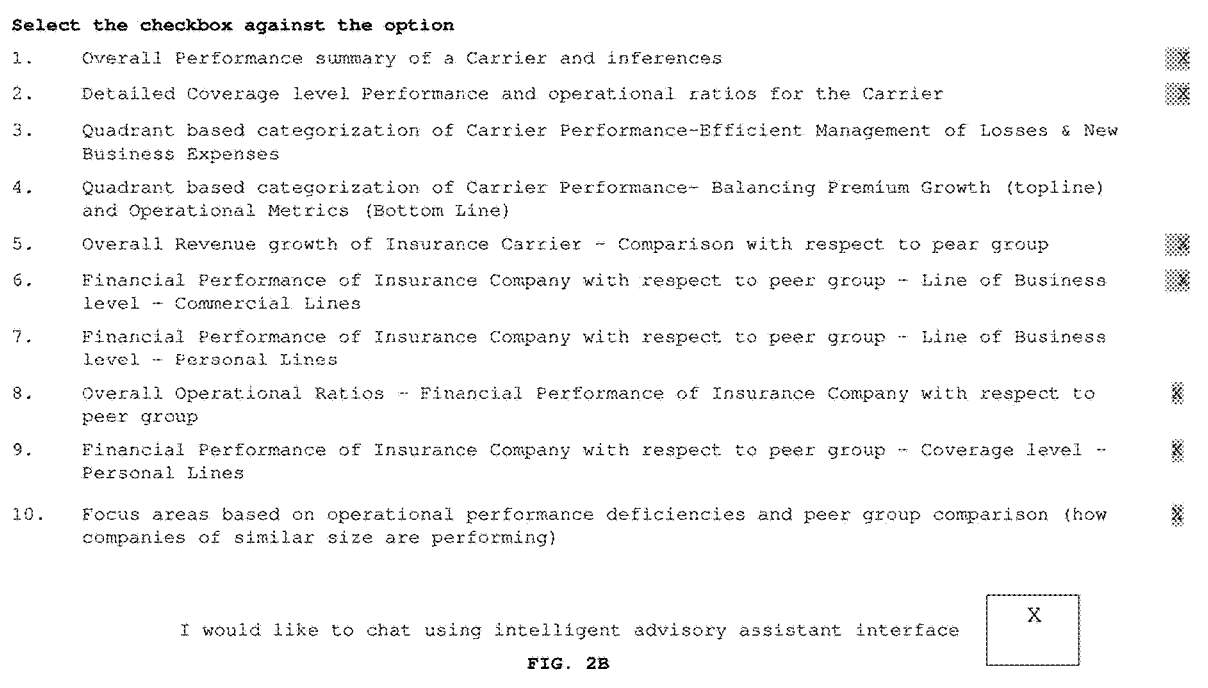

Select the checkbox against the option

1.  Overall Performance summary of a Carrier and inferences ▨

2.  Detailed Coverage level Performance and operational ratios for the Carrier ▨

3.  Quadrant based categorization of Carrier Performance-Efficient Management of Losses & New Business Expenses 4.  Quadrant based categorization of Carrier Performance- Balancing Premium Growth (topline) and Operational Metrics (Bottom Line)

5.  Overall Revenue growth of Insurance Carrier - Comparison with respect to pear group ▨

6.  Financial Performance of Insurance Company with respect to peer group - Line of Business level - Commercial Lines ▨

7.  Financial Performance of Insurance Company with respect to peer group - Line of Business level - Personal Lines 8.  Overall Operational Ratios - Financial Performance of Insurance Company with respect to peer group ▨

9.  Financial Performance of Insurance Company with respect to peer group - Coverage level - Personal Lines ▨

10. Focus areas based on operational performance deficiencies and peer group comparison (how companies of similar size are performing) ▨

I would like to chat using intelligent advisory assistant interface  [ X ]

FIG. 2B

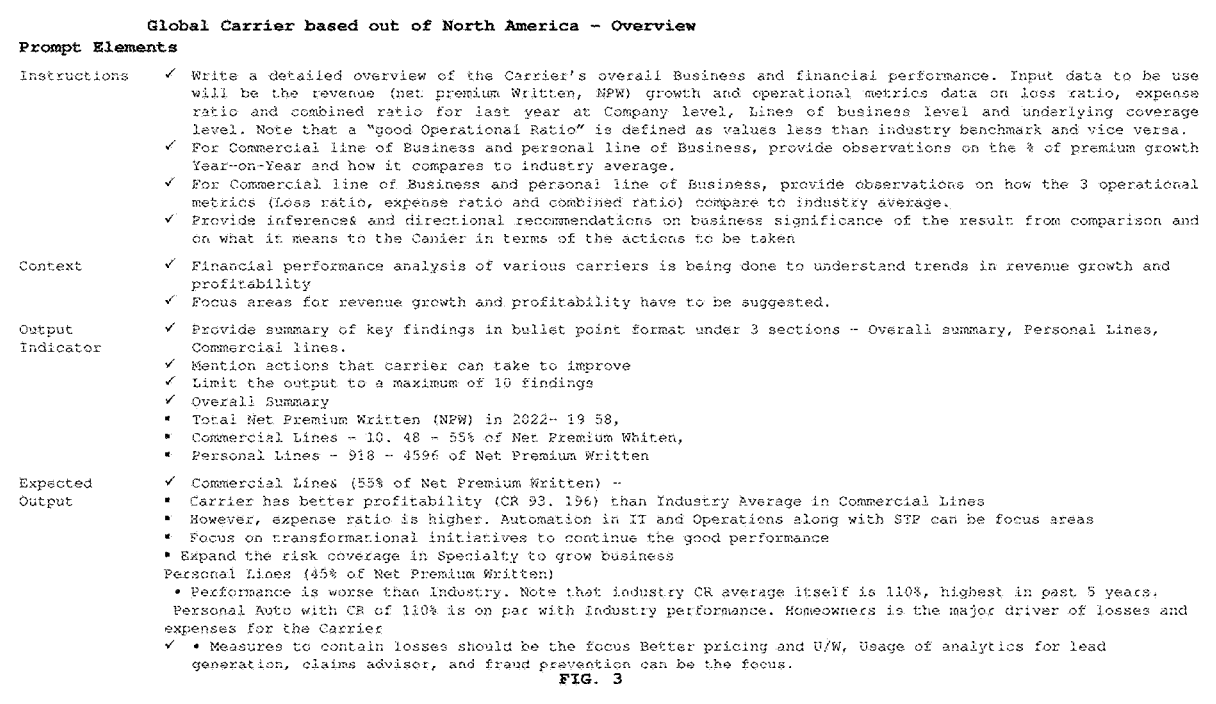

Global Carrier based out of North America – Overview

Prompt Elements

Instructions
- ✓ Write a detailed overview of the Carrier's overall Business and financial performance. Input data to be use will be the revenue (net premium Written, NPW) growth and operational metrics data on loss ratio, expense ratio and combined ratio for last year at Company level, Lines of business level and underlying coverage level. Note that a "good Operational Ratio" is defined as values less than industry benchmark and vice versa.
- ✓ For Commercial line of Business and personal line of Business, provide observations on the % of premium growth Year-on-Year and how it compares to industry average.
- ✓ For Commercial line of Business and personal line of Business, provide observations on how the 3 operational metrics (Loss ratio, expense ratio and combined ratio) compare to industry average.
- ✓ Provide inferences and directional recommendations on business significance of the result from comparison and on what it means to the Carrier in terms of the actions to be taken Context
- ✓ Financial performance analysis of various carriers is being done to understand trends in revenue growth and profitability
- ✓ Focus areas for revenue growth and profitability have to be suggested.

Output Indicator
- ✓ Provide summary of key findings in bullet point format under 3 sections – Overall summary, Personal Lines, Commercial lines.
- ✓ Mention actions that carrier can take to improve
- ✓ Limit the output to a maximum of 10 findings
- ✓ Overall Summary
- ▪ Total Net Premium Written (NPW) in 2022– 19 58,
- ▪ Commercial Lines – 10. 48 – 55% of Net Premium Whiten,
- ▪ Personal Lines – 918 – 45% of Net Premium Written Expected Output
- ✓ Commercial Lines (55% of Net Premium Written) –
- ▪ Carrier has better profitability (CR 93. 196) than Industry Average in Commercial Lines
- ▪ However, expense ratio is higher. Automation in IT and Operations along with STP can be focus areas
- ▪ Focus on transformational initiatives to continue the good performance
- ▪ Expand the risk coverage in Specialty to grow business
  Personal Lines (45% of Net Premium Written)
  • Performance is worse than Industry. Note that industry CR average itself is 110%, highest in past 5 years. Personal Auto with CR of 110% is on par with Industry performance. Homeowners is the major driver of losses and expenses for the Carrier
- ✓ • Measures to contain losses should be the focus Better pricing and U/W, Usage of analytics for lead generation, claims advisor, and fraud prevention can be the focus.

FIG. 3

Global Carrier based out of North America- Overview

Overall Summary

- Total Net Premium Written (NPW) in 2022
  - ~19.58,
- Commercial Lines - 10.40 - 55% of NPW,
- Personal Lines - 9.18 - 45% of NPW

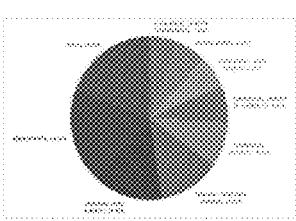

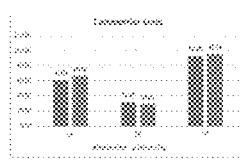

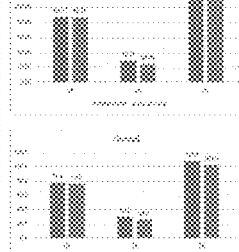

- Commercial Lines (55% of NPW) - Carrier has better profitability (CR 93.1%) than Industry Average in Commercial Lines
- However, expense ratio is higher. Automation in IT and Operations along with STP can be focus areas.
- Focus on transformational initiatives to continue the good performance
- Expand the risk coverage in Specialty to grow business

---

- Personal Lines (45% of NPW) - Performance is worse than Industry. Note that industry CR average itself is 110%, highest in past 5 years.
- Personal Auto with CR of 110% is on par with Industry performance. Homeowners is the major driver of losses and expenses for the Carrier
- Measures to contain losses should be the focus. Better pricing and U/W, Usage of analytics for lead generation, claims advisory and fraud prevention can be the focus.

FIG. 3A

Coverage Level Operational ratios for the Carrier

Prompt Elements

| | |
|---|---|
| Instructions | ✓ Write a concise summary of coverage level performance analysis based on the operational metrics data on loss ratio, expense ratio and combined ratio for last year at coverage level. |
| | ✓ Compare the 3 operational metrics of each coverage to average industry benchmark metrics for the year. Note that a "Good Operational Ratio" is defined as value less than industry benchmark and vice versa. |
| | ✓ Identify the root cause of which carriers are deviating significantly to average industry metrics in a positive or negative way |
| Context | ✓ Financial performance analysis of various carriers is being done based on the coverages offered to understand trends in revenue and profitability. Focus areas are to be suggested to carriers for revenue growth and profitability |
| Output Indicator | ✓ Provide summary of key findings in bullet point format |
| | ✓ Mention actions that carrier can take to improve |
| | ✓ Limit the output to a maximum of 10 findings |
| | ✓ Worse Performing Coverages where operational ratios are less than industry average are Home-Owner; Commercial Property, Personal Auto. |
| | ✓ Best Performing Coverages where at least one of the operational ratios is greater than industry average – None |
| Expected Output | ✓ Recommendations for Loss Ratio Improvement for Homeowners and Commercial Property Coverages are – Focus on building Policyholder Advisory Capabilities, appropriate pricing in proportion to the risk to prevent or minimize claims costs and claim impact can help. Product rationalization can also be considered. |
| | ✓ Recommendations for Expense Ratio Improvement are to look for Opportunities for expense ratio improvements across the board such as Targeted IT optimization, Straight thro Processing, Agency modernization, Better lead generation through analytics, UW modernization etc. |

FIG. 4

Global Carrier - Coverage level operational ratios

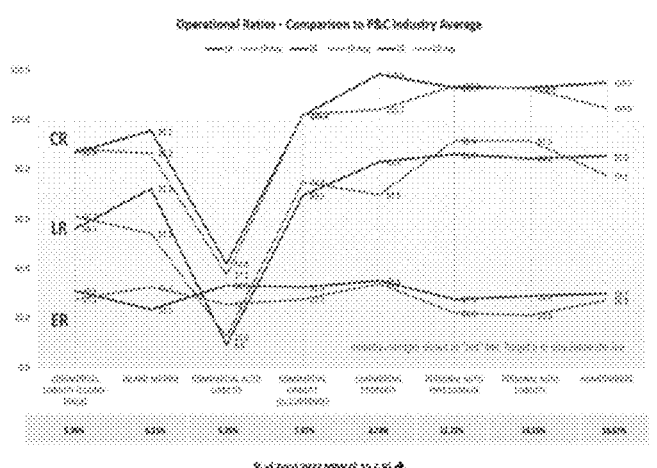

Inferences

Loss Ratio -

Homeowners and Commercial Property-
Focus on building Policyholder Advisory Capabilities, appropriate pricing in proportion to the risk to prevent or minimize claims costs and claim impact can help. Product rationalization can also be considered.

Expense Ratio -

Opportunities for expense ratio improvements across the board-
Targeted IT optimization, STP, Agency interfacing, Better lead generation through analytics and U/W modernization.

Fig. 4A

Quadrant based categorization of Carrier Performance-Balancing Premium Growth (topline) and Operational Metrics (Bottom Line)

Prompt Elements

| | |
|---|---|
| Instructions | ✓ Write a concise summary of the findings based on performance of Carriers in North America. Data to be used would be the revenue (Net Premium Written, NPW) growth and operational metrics data on loss ratio, expense ratio and combined ratio for last year at Company level, Lines line of business level and underlying coverage level. Note that "Good Operational Ratio" is defined as values less than industry benchmark and vice versa. |
| | ✓ Classify carriers into 4 Quadrants as per criteria below. |
| | ✓ Quadrant 1 represents Carriers with NPW Growing and good ratios |
| | ✓ Quadrant 2 represents Carriers with NPW not growing with good operational ratios |
| | ✓ Quadrant 3 represents Carriers with NPW not Growing and bad ratios |
| | ✓ Quadrant 4 represents Carriers with NPW Growing and bad ratios |
| | ✓ Provide inferences and directional recommendation on business significance of each quadrant and on what it means to the Carrier placed in that Quadrant |
| Context | ✓ Financial performance analysis of various carriers is being done to understand trends in revenue growth and profitability |
| | ✓ Intent is to suggest focus areas (lines of business and coverage) to Personal Insurance Carriers for revenue growth and profitability |
| Output Indicator | ✓ Provide summary of key findings in bullet point format under two headings. Inferences Directional Recommendation |
| | ✓ Mention actions that carrier can take to improve |
| | ✓ Limit the output to a maximum of 10 findings |
| | Inferences |
| Expected Output | ✓ Quadrant 1 represents best Carrier - Premium growing will good opening ratios -Healthy Carriers focusing on Capability and Branding |
| | ✓ Quadrant 3 & 4 Camera can improve business vitals and with turn around initiatives |
| | ✓ Quadrant 3- Carrier is at risk of losing book of business, Continued monitoring and focus growth in right areas needed |
| | Directional Recommendations |
| | ✓ Act on the opportunities to improve Loss Ratio (Quadrants 3 & 4) - end-.to-end claims operating model, underwriting excellence analytics for fraud detection, geographical expansion to minimize risk etc. |
| | ✓ Consider a wide range of expense ratio related improvement initiatives (Quadrants 3 & 4)- targeting the right group of customers, analytics for customer retention and agency management. Automation and IT transformational initiatives, Eliminate redundant hardware software, optimizing partner vendor networks etc. |
| | ✓ Leverage the best practices in business growth from Quadrant 1 carriers to other Carriers from Quadrant 2 & 3. |

Fig. 5

Quadrant based categorization of Carrier Performance - Balancing Premium Growth (topline) and Operational Metrics
(Bottom Line)

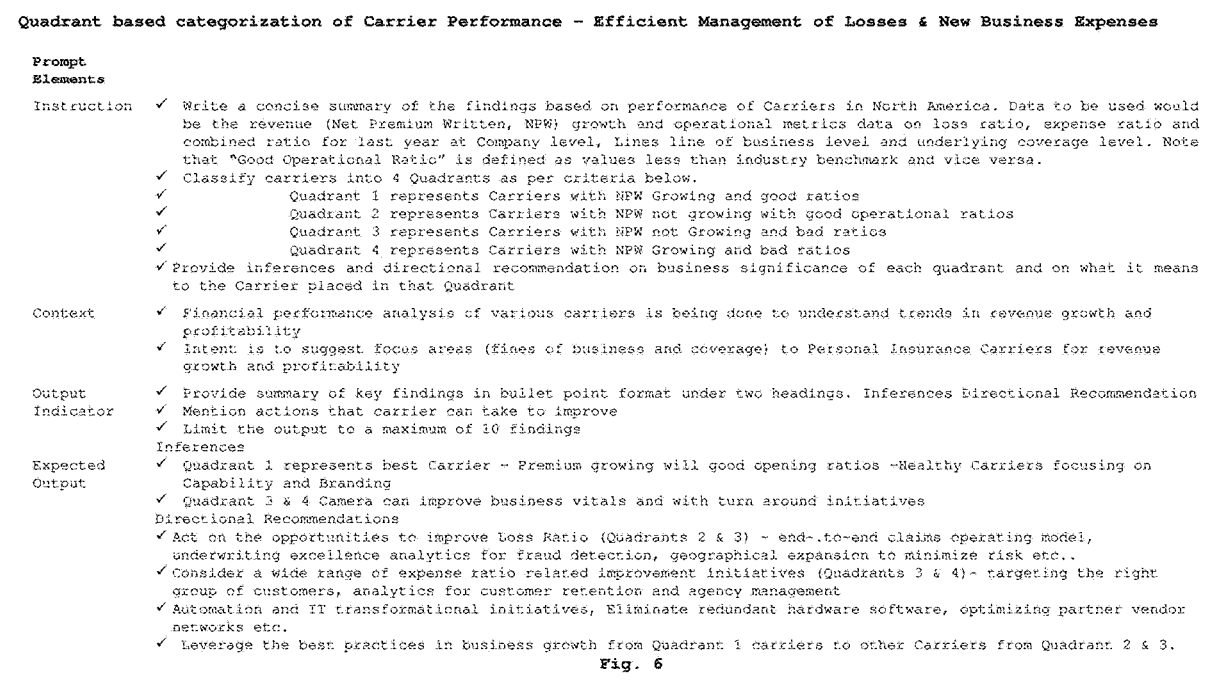

Quadrant based categorization of Carrier Performance – Efficient Management of Losses & New Business Expenses

Prompt Elements

Instruction
- ✓ Write a concise summary of the findings based on performance of Carriers in North America. Data to be used would be the revenue (Net Premium Written, NPW) growth and operational metrics data on loss ratio, expense ratio and combined ratio for last year at Company level, Lines line of business level and underlying coverage level. Note that "Good Operational Ratio" is defined as values less than industry benchmark and vice versa.
- ✓ Classify carriers into 4 Quadrants as per criteria below.
- ✓      Quadrant 1 represents Carriers with NPW Growing and good ratios
- ✓      Quadrant 2 represents Carriers with NPW not growing with good operational ratios
- ✓      Quadrant 3 represents Carriers with NPW not Growing and bad ratios
- ✓      Quadrant 4 represents Carriers with NPW Growing and bad ratios
- ✓ Provide inferences and directional recommendation on business significance of each quadrant and on what it means to the Carrier placed in that Quadrant Context
- ✓ Financial performance analysis of various carriers is being done to understand trends in revenue growth and profitability
- ✓ Intent is to suggest focus areas (lines of business and coverage) to Personal Insurance Carriers for revenue growth and profitability Output Indicator
- ✓ Provide summary of key findings in bullet point format under two headings. Inferences Directional Recommendation
- ✓ Mention actions that carrier can take to improve
- ✓ Limit the output to a maximum of 10 findings Inferences Expected Output
- ✓ Quadrant 1 represents best Carrier – Premium growing will good opening ratios –Healthy Carriers focusing on Capability and Branding
- ✓ Quadrant 3 & 4 Camera can improve business vitals and with turn around initiatives Directional Recommendations
- ✓ Act on the opportunities to improve Loss Ratio (Quadrants 2 & 3) – end-.to-end claims operating model, underwriting excellence analytics for fraud detection, geographical expansion to minimize risk etc..
- ✓ Consider a wide range of expense ratio related improvement initiatives (Quadrants 3 & 4)- targeting the right group of customers, analytics for customer retention and agency management
- ✓ Automation and IT transformational initiatives, Eliminate redundant hardware software, optimizing partner vendor networks etc.
- ✓ Leverage the best practices in business growth from Quadrant 1 carriers to other Carriers from Quadrant 2 & 3.

Fig. 6

Quadrant based categorization of Carrier Performance - Efficient Management of Losses & New Business
Expenses

Carrier Performance – Overall Revenue Growth from 2021 to 2022

Prompt Elements

| | |
|---|---|
| Instructions | ✓ Summarize the revenue growth performance of prominent insurance carriers based on revenue growth data for last year at company level, line of business level and coverage level. |
| | ✓ Compare the growth of each Carrier to average industry growth for the year to identify major deviations from benchmarks. |
| | ✓ Identify root cause of which line of business and coverages are contributing significantly to growth in a positive or negative way |
| Context | ✓ Financial performance analysis of various carriers is being done to understand trends in revenue growth and profitability |
| | ✓ Intent is to suggest focus areas (lines of business and coverages) to Personal Insurance Carriers for revenue growth and profitability |
| Output Indicator | ✓ Provide summary of key findings in bullet point format |
| | ✓ Mention actions that carrier can take to improve |
| | ✓ Limit the output to a maximum of 10 findings |
| Expected Output | ✓ All carriers have grown Premium except two (Kemper and Munich Re). |
| | ✓ 27 carriers (out of 44) have grown premium more than the P&C industry average of 7.7%. |
| | ✓ Net premiums written (NPW) continue to grow due to hard market conditions. |
| | ✓ Commercial Lines line of business premiums increased across all lines in 2022, marking 21 consecutive quarters of price increases. |
| | ✓ Specialty coverages are playing significant role in growth of commercial insurance line of Business. (~18% of overall Commercial Lines Premium in 2022) . Premium for this segment has increased by ~20% from 2021. |
| | ✓ Scope for new IT and Operations support initiatives as NPW is projected to increase significantly over the coming years. |

FIG. 7

Carrier Performance - Overall Revenue Growth from 2021 to 2022

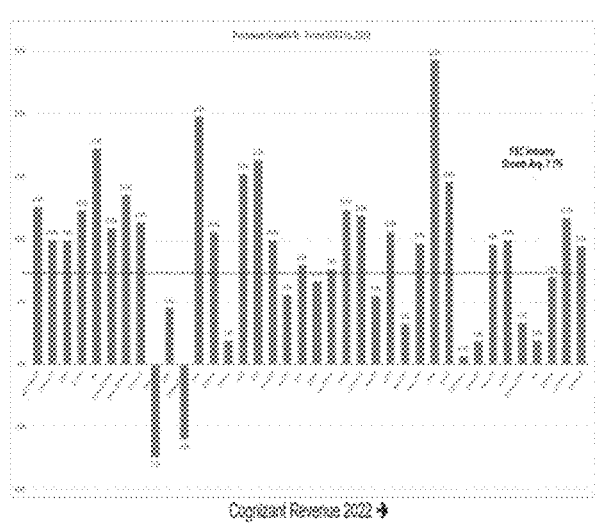

✓ All SBU carriers have grown Premium except two (Kemper and Munich Re)
✓ 27 SBU carriers (out of 44) have grown premium more than the PSC industry average of 7.7%.

✓ Property and casually insurer net premiums written (NPW) continue to grow due to hard market conditions.
✓ Commercial Lines premiums increased across all lines in 2022, marking 21 consecutive quarters of price increases.

✓ Specialty lines (Excess & Surplus) is estimated to be ~18% of overall Commercial Lines Premium in 2022 . NPW for this segment has increased by ~20% from 2021. Scope for IT and Operations support as NPW is projected to increase significantly over the coming years

FIG. 7A

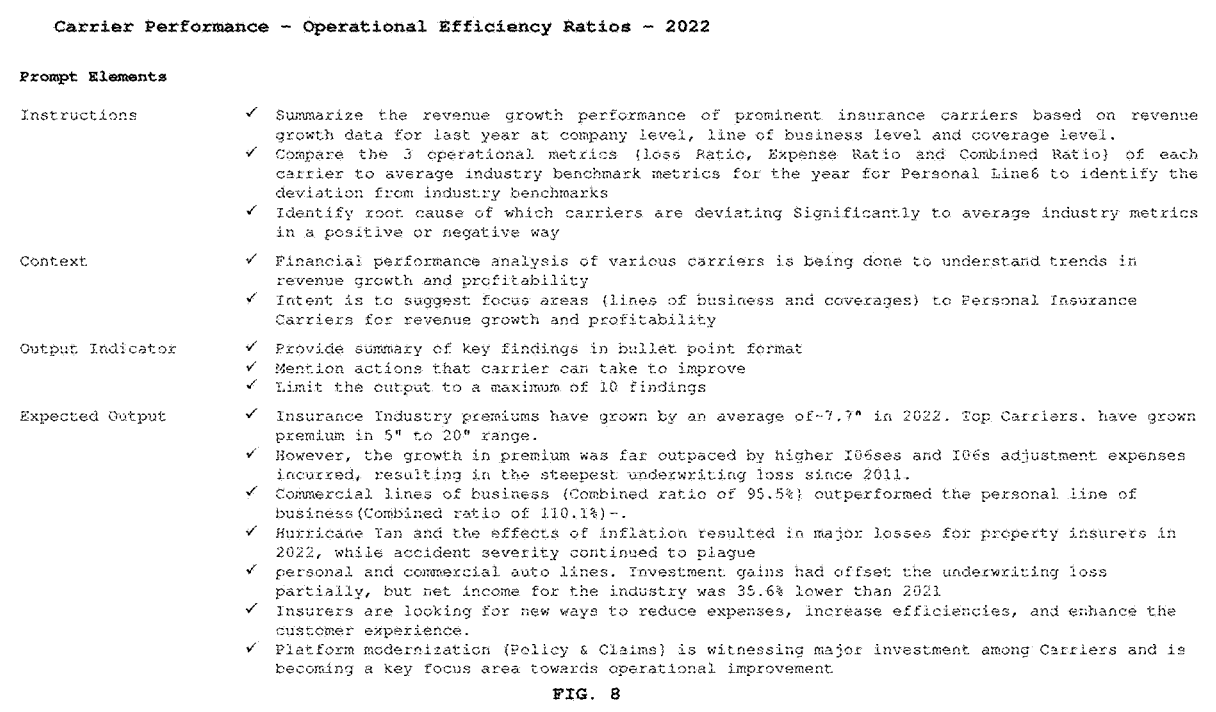

Carrier Performance – Operational Efficiency Ratios – 2022

Prompt Elements

Instructions
- ✓ Summarize the revenue growth performance of prominent insurance carriers based on revenue growth data for last year at company level, line of business level and coverage level.
- ✓ Compare the 3 operational metrics (loss Ratio, Expense Ratio and Combined Ratio) of each carrier to average industry benchmark metrics for the year for Personal Line6 to identify the deviation from industry benchmarks
- ✓ Identify root cause of which carriers are deviating Significantly to average industry metrics in a positive or negative way Context
- ✓ Financial performance analysis of various carriers is being done to understand trends in revenue growth and profitability
- ✓ Intent is to suggest focus areas (lines of business and coverages) to Personal Insurance Carriers for revenue growth and profitability Output Indicator
- ✓ Provide summary of key findings in bullet point format
- ✓ Mention actions that carrier can take to improve
- ✓ Limit the output to a maximum of 10 findings Expected Output
- ✓ Insurance Industry premiums have grown by an average of~7.7" in 2022. Top Carriers. have grown premium in 5" to 20" range.
- ✓ However, the growth in premium was far outpaced by higher I06ses and I06s adjustment expenses incurred, resulting in the steepest underwriting loss since 2011.
- ✓ Commercial lines of business (Combined ratio of 95.5%) outperformed the personal line of business(Combined ratio of 110.1%)-.
- ✓ Hurricane Ian and the effects of inflation resulted in major losses for property insurers in 2022, while accident severity continued to plague
- ✓ personal and commercial auto lines. Investment gains had offset the underwriting loss partially, but net income for the industry was 35.6% lower than 2021
- ✓ Insurers are looking for new ways to reduce expenses, increase efficiencies, and enhance the customer experience.
- ✓ Platform modernization (Policy & Claims) is witnessing major investment among Carriers and is becoming a key focus area towards operational improvement

FIG. 8

Carrier Performance - Operational Efficiency Ratios 2022

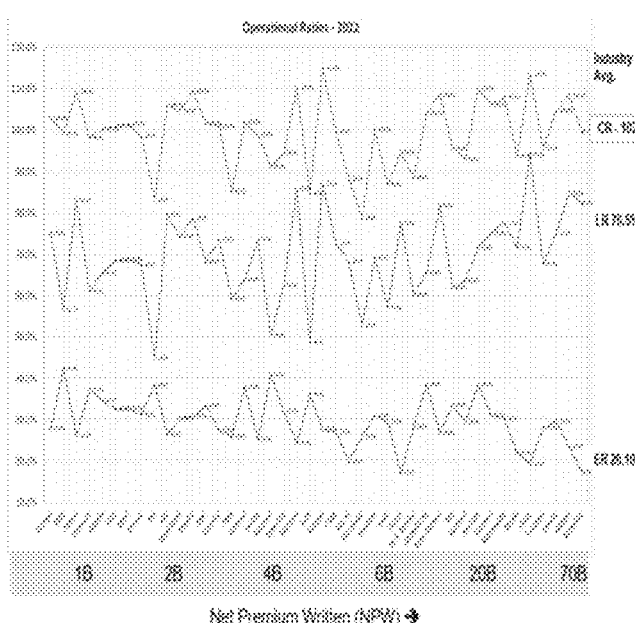

P&C Industry premiums have grown by an average ofIndustryAvg.~7.7% in 2022. Top SBU Carriers have grown premium in 5% to 20% range. However, the growth in premium was far outpaced by higher losses and loss adjustment expenses incurred, resulting in the steepest underwriting loss since 2011.

Commercial market (Combined ratio of 95.5%) outperformed the personal market (Combined ratio of 110.1%). In addition to higher rates, commercial carriers have tightened underwriting guidelines by raising deductibles and implementing more restrictive terms on property risks.

Hurricane Ian and the effects of inflation resulted in major losses for property insurers in 2022, while accident severity continued to plague personal and commercial auto lines. Investment gains had offset the underwriting loss partially, but net income for the Industry was 35.6% lower than 2021.

Actions for organization-
Insurers are looking for new ways to reduce expenses, increase efficiencies, and enhance the customer experience. Platform modernization (Policy & Claims) is witnessing major investment among SBU Carriers and is becoming a key focus area towards operational improvement.

FIG. 8A

Carrier Performance – Personal Lines – Overall Revenue Growth from 2021 to 2022

Prompt Elements

| | |
|---|---|
| Instructions | ✓ Summarize the revenue growth performance of prominent insurance carriers based on revenue growth data for last year at company level, line of business level and coverage level.<br>✓ Compare the 3 operational metrics (loss Ratio, Expense Ratio and Combined Ratio) of each carrier to average industry benchmark metrics for the year for Personal Lines to identify the deviation from industry benchmarks<br>✓ Identify root cause of which carriers are deviating significantly to average industry metrics in a positive or negative way |
| Context | ✓ Financial performance analysis of various carriers is being done to understand trends in revenue growth and profitability<br>✓ Intent is to suggest focus areas (lines of business and coverages) to Personal Insurance Carriers for revenue growth and profitability |
| Output Indicator | ✓ Provide summary of key findings in bullet point format<br>✓ Mention actions that carrier can take to improve<br>✓ Limit the output to a maximum of 10 findings |
| Expected Output | ✓ All Carrier (except USAA and Geico) are performing worse than average on new business acquisition expenses<br>✓ Focus areas for improvement can be on Omni channel experience, Underwriting rules optimization, STP opportunities, Backoffice process automation and agency modernization.<br>✓ Better loss management through claims process automation, pricing risk Segmentation, simpler product design can help.<br>✓ The combined ratio for this segment reached a 15-year high at 110.19%, driven primarily by poor results in personal auto coverage<br>✓ Small to mid Size carriers should focus on expense ratio improvement6 such as IT and process automation, Policy Administration System reengineering, Agency modernization etc.<br>✓ Larger carriers would need focus on 106& ratio improvements such as Claims process optimization and Subrogation<br>✓ The personal lines market compri6ed 56.1% of the industry's net losses incurred in 2022. |

FIG. 9

Carrier Performance in Personal Lines - Overall Revenue Growth from 2021 to 2022

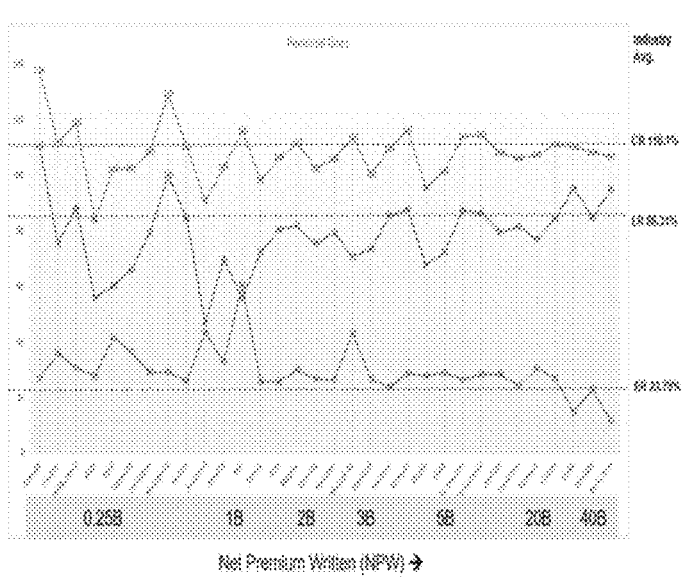

Net Premium Written (NPW) →

FIG. 9A

Inferences for Industry
- The personal lines market comprised 56.1% of the industry's net losses and LAE incurred in 2022.
- The combined ratio for this segment reached a 15-year high at 110.1%, driven primarily by poor personal auto results.
- Small to mid size carriers should focus on expense ratio improvements (IT and process automation, PAS reengineering, Agency modernization)
- Larger carriers would need focus on loss ratio improvements -Claims process optimization and Subrogation

Actions

- All Carriers (except USAA and Geico are performing worse than average on new business acquisition expenses. Focus can be on Omni channel experience, Underwriting rules optimization, SIP opportunities, Backoffice process automation and agency modernization
- Better loss management through claims process automation, pricing/risk segmentation, simpler product design can help

Carrier Performance- Commercial Lines- Overall Revenue Growth from 2021 to 2022

Prompt Elements

| | |
|---|---|
| Instructions | ✓ Summarize the operational performance of Commercial Lines Carriers based on operational metrics for last year at Commercial Lines line of business level and underlying coverage level. |
| | ✓ Compare the 3 operational metrics (Loss Ratio, Expense Ratio and Combine Ratio) of each carrier to average industry benchmark metrics for the year for Personal lines to identify the deviation from industry benchmarks. |
| | ✓ Identify the root cause of which carriers are deviating significantly to average industry metrics in a positive or negative way |
| Context | ✓ Financial performance analysis of various carriers is being done to understand trends in revenue growth and profitability |
| | ✓ Intent is to suggest focus areas (lines of business and coverages) to Insurance Carriers for revenue growth and profitability |
| Output Indicator | ✓ Provide summary of key findings in bullet point format |
| | ✓ Mention actions that carrier can take to improve |
| | ✓ Limit the output to a maximum of 10 findings |
| | ✓ Commercial Carriers continue to grow profitably. Mid size carriers with specialty lines are looking for PAS modernization and claims process optimization to enable growth to accommodate the expanding risk coverage. |
| | ✓ Unlike Personal Lines, all carriers are operating profitably in Commercial lines along with growing premium. (except AmFam and USAA). |
| Expected Output | ✓ Good potential for to aggressively look for transformation opportunities in Underwriting and Claims to support Carrier topline and bottom-line growth. |
| | ✓ Loss ratios are well below average for 90% of carriers. However, ~40% of them have expense ratios higher than average. Scope for Product rationalization, IT and Ops automation opportunities. |
| | ✓ Specialty coverages are playing significant role in growth of commercial insurance line of Business. (~18% of overall Commercial Lines Premium in 2022). Premium for this segment has increased by ~20% from 2021. Scope for new IT and Operations support initiatives as NPW is projected to increase significantly over the coming years. |

FIG. 10

Carrier Performance in Commercial Lines - Revenue Growth from 2021 to 2022

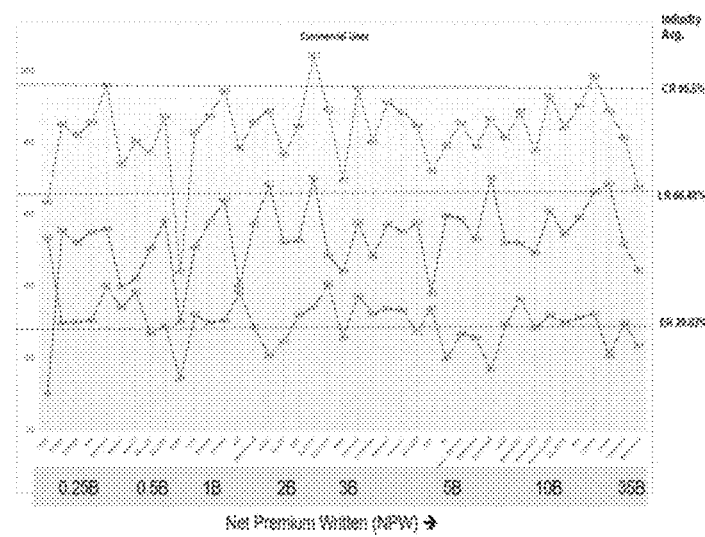

Net Premium Written (NPW) →

Inferences for Industry

Commercial Carriers continue to grow
profitably. Mid size carriers with
specialty lines are looking for PAS
modernization and claims process
optimization to enable growth to
accommodate the expanding risk coverage.

Actions
- Unlike Personal Lines, all carriers
  are operating profitably in
  Commercial lines along with growing
  premium. (except Amfam and USAA).
  Good potential for Cognizant to
  aggressively look for transformation
  opportunities in U/W and Claims to
  support Carrier topline and bottom-
  line growth.
- Loss ratios are well below average
  for 90% of carriers. However, ~40%of
  them have expense ratios higher than
  average. Scope for Product
  rationalization, IT and Ops
  automation opportunities.

FIG. 10A

Coverage Level Operational Performance across peer group companies

Prompt Elements

| | |
|---|---|
| Instructions | ✓ Summarize the operational metrics data on loss ratio, expense ratio and combine ratio for last year for all Insurance Carriers for Private Passenger Auto Coverage across the Country.<br>✓ Compare the 3 operational metrics (Loss Ratio, Expense Ratio and Combine Ratio) of each carrier to average industry benchmark metrics for the year to identify the deviation from industry benchmarks.<br>✓ Identify the root cause of which carriers are deviating significantly to average industry metrics in a positive or negative way |
| Context | ✓ Financial performance analysis of various carriers is being done to understand trends in revenue growth and profitability<br>✓ Intent is to suggest focus areas (lines of business and coverages) to Personal Insurance Carriers for revenue growth and profitability |
| Output Indicator | ✓ Provide summary of key findings in bullet point format<br>✓ Mention actions that carrier can take to improve<br>✓ Limit the output to a maximum of 10 findings |
| Expected Output | ✓ Personal auto physical damage coverage had its worst result in over 25 years in 2022, with a direct loss ratio more than 20% above the average of the 25 years preceding, and 12% above the second-highest, which was 2021.<br>✓ Elevated used car prices were a main driver of claims inflation in 2022. The cost of repairs has also increased and will likely contribute to higher claims costs.<br>✓ As economic activity returned to normal in 2021 & 2022 following the Covid-19 shutdowns, auto claims activity returned to normal frequency. The YoY increase in frequency is now compounded by economic inflation.<br>✓ Industry experienced a shift in its claims mix toward more severe accidents in the pandemic era as less congestion has led to more crashes occurring at higher speeds<br>✓ Opportunities for expense ratio improvements through underwriting modernization and IT optimization. |

FIG. 11

Coverage Level Operational Performance across peer group companies

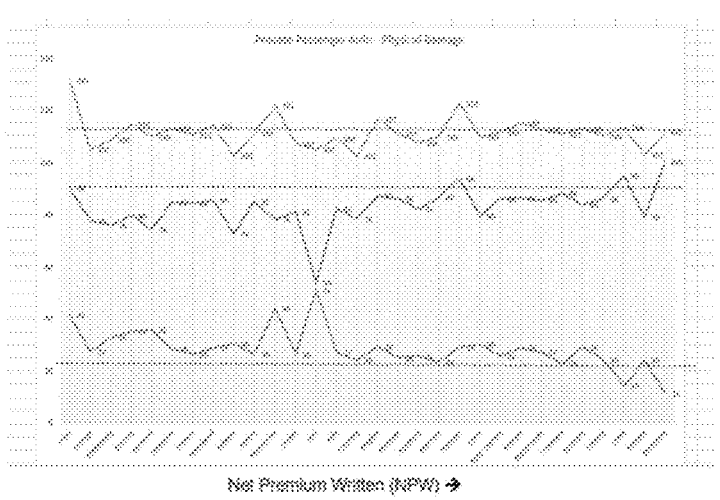

Personal auto physical damage had its worst result in over 25 years in 2022, with a direct loss ratio more than 20% above the average of the 25 years preceding, and 12% above the second-highest, which was 2021.

Elevated used car prices were a main driver of claims inflation in2022. The cost of repairs has also increased and will likely contribute to higher claims costs.

Inferences for Cognizant
Opportunities for expense ratio improvements through underwriting modernization and IT optimization. Carriers with highest CR needing deep dive - AIG, Kemper, Amfam, Allstate, Nationwide, Liberty.

FIG. 11A

Heat Map of Focus Areas, Customer Initiatives and Opportunities

Prompt Elements

| | |
|---|---|
| Instructions | ✓ Summarize the focus areas the Carrier needs to focus on based on operational metrics deficiencies. |
| | ✓ Suggest IT initiatives and focus areas that Peer group carriers of similar size have been focusing on. |
| | ✓ Highlight target areas where Carriers have been working on their own Vs areas where work is being done through partnerships |
| Context | ✓ Financial performance analysis of various carriers is being done to understand trends in revenue growth and profitability |
| | ✓ Intent is to suggest focus areas (lines of business and coverages) to Personal Insurance Carriers for revenue growth and profitability |
| Output Indicator | ✓ Provide summary of key findings in bullet point format under 3 sections. Recommendations for Loss Ratio, Optimization of Expense Ratio and Ongoing Focus areas of peer group carriers. |
| | ✓ Mention actions that carrier can take to improve |
| | ✓ Limit the output to a maximum of 10 findings |
| | ✓ The carrier's loss ratio is significantly worse than benchmark average. Suggested initiatives to fix this issue would involve Claims automation, Subrogation optimization, risk selection and pricing. |
| Expected Output | ✓ The Carrier's expense ratio is on par with benchmark. However, there is scope for improvement by focusing on Business Process Digitization- Applying digital to improve omni- channel experience, Agency Modernization and Process Automation |
| | ✓ Carriers of similar size in the industry have been focusing on following and there can be an opportunity for the Carrier to start work on some these areas it they are not already part of the current priorities -- Business process modernization, IT Procurement optimization, Fraud Prevention. |

FIG. 12

Recommended Focus Areas for Carriers

FIG. 12A

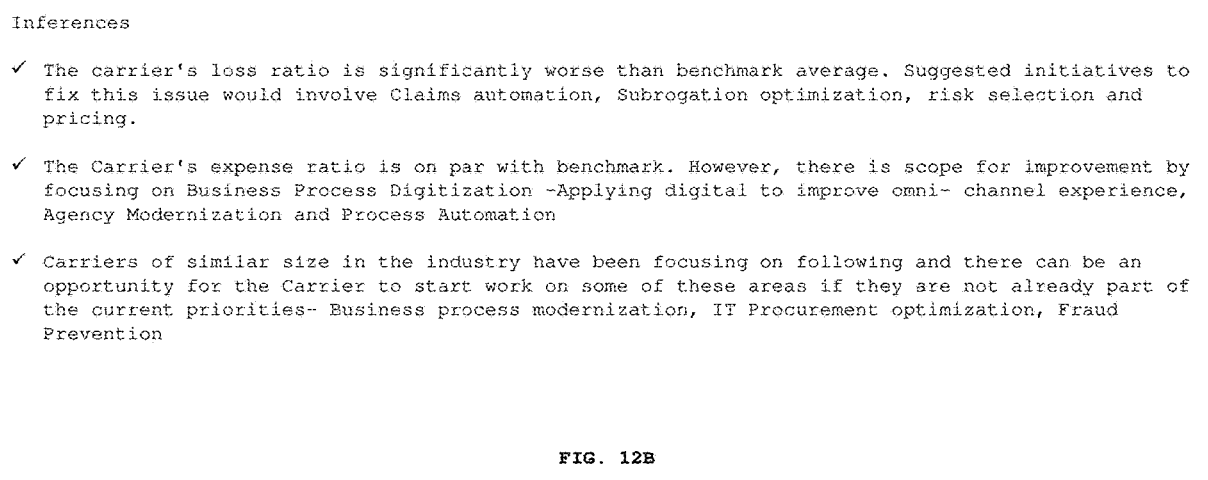

Inferences

✓ The carrier's loss ratio is significantly worse than benchmark average. Suggested initiatives to fix this issue would involve Claims automation, Subrogation optimization, risk selection and pricing.

✓ The Carrier's expense ratio is on par with benchmark. However, there is scope for improvement by focusing on Business Process Digitization -Applying digital to improve omni- channel experience, Agency Modernization and Process Automation ✓ Carriers of similar size in the industry have been focusing on following and there can be an opportunity for the Carrier to start work on some of these areas if they are not already part of the current priorities- Business process modernization, IT Procurement optimization, Fraud Prevention

FIG. 12B

Focus Areas based on P&C Carrier Vitals

| Focus Areas | Opportunities to explore | Expense Management | Loss Control |
|---|---|---|---|
| Underwriting Excellence | • Improve underwriting effectiveness (quality of risk selection and bind rate)<br>• Enhance underwriting and pricing capabilities through advanced analytics to improve loss accuracy<br>• Improve Straight through processing | ◉ | ◉ |
| Retention Management | • Review existing analytics/key performance indicators used for performance management<br>• Use of Analytics to understand churn and retention factors, root causes of customer attrition during customer life cycle, opportunities to increase reach within certain client bases<br>• Make data-backed performance improvements and support capability building for call-center agents | ◉ | ◯ |
| End-to-End Claims Operating Model | • Find Opportunities to Capture most important data during First Notice Of Loss<br>• Standardize intake procedures to reduce rework<br>• Optimize claims processing through standard work and job aides | ◉ | ◉ |
| Claims Recoveries | • Use analytics driven fraud identification and prevention processes<br>• Identify subrogation and salvage opportunities early<br>• Prioritize fraud and subrogation opportunities based on value at stake | ◯ | ● |

Size of Impact:     ◯  No Impact     ◉  Moderate     ●  High

Fig. 13A

GEN AI-BASED IMPROVED END-TO-END DATA ANALYTICS TOOL

CROSS REFERENCE TO RELATED APPLICATION

This application is related to and claims the benefit of Indian Patent Application number 202341088434 filed on Dec. 23, 2023, the contents of which are herein incorporated by reference in their entirety.

FIELD OF THE INVENTION

The present invention relates generally to the field of data analytics. More particularly, the present invention relates to a generative artificial intelligence based improved end-to-end data analytics tool.

BACKGROUND OF THE INVENTION

Data analytics is carried out by different organizations for achieving a specific goal with respect to pre-defined requirements by processing and analyzing large amounts of organization specific datasets. In order to carry out the data analytics process adequately, datasets are collected from multiple data sources and locations. The datasets are present in different and varied formats. As such, it becomes difficult for the organizations to uniformly process the data to determine insights from the datasets with respect to pre-defined requirements.

In existing systems, typically, a siloed approach to address data analysis issues locally within their scope of work. Further, due to large-scale nature of organization's operations and fast-evolving technological trends such approach is suboptimal and does not provide accurate results. Therefore, there does not exist a single end-to-end data analytics tool which covers diagnostics to recommendations aspect. Further, defining and implementing and end-to-end tool that analyzes various operational metrics associated with data analysis is complex and fraught with multiple technical challenges such as data being accessed from disparate sources, aggregating and processing the data using customized algorithms, generating relevant analytics to users, plotting the trends visually and deriving major operational challenges to be addressed to grow top-line and bottom-line profitably and generate recommendations for improving organization's performance.

Also, the existing data analysis tools are not easily accessible to the users, as accessing, ingesting, storage and processing of data of various types is a challenging task. Further, the interface of existing data analytics tools is not user friendly, as they do not provide suitable conservation and chat options for catering to user queries. Furthermore, the existing techniques do not provide analytics capabilities for dissecting and aggregating data at multiple levels with intuitive navigation and a configurable workflow.

In light of the aforementioned drawbacks, there is a need for a system and a method which provides for an improved end-to-end data analytics tool. There is a need for a system and a method which provides for uniformly analyzing and processing data from multiple sources and of different formats. There is a need for a system and a method which provides for a collaborated approach for effectively addressing data analysis issues. Further, there is a need for a generative artificial intelligence-based end-to-end data analytics tool which covers diagnostics to recommendations aspect. Further, there is a need for a system and a method which provides for efficiently analyzing complex operational metrics associated with data analysis. Also, there is a need for a system and a method which provides for improved analytics capabilities for dissecting and aggregating data at multiple levels with intuitive navigation and a configurable workflow. Yet further, there is a need for a system and a method which provides for enhanced visualization and chat capabilities related to data analytics.

SUMMARY OF THE INVENTION

In various embodiments of the present invention, a generative artificial intelligence-based system for providing an improved end-to-end data analytics tool is provided. The system comprises a memory storing program instructions, a processor executing program instructions stored in the memory and a data analytics engine executed by the processor. The data analytics engine is configured to collect data from input unit(s) associated with multiple data sources located at disparate locations. A data quality assessment is performed based on one or more pre-determined criteria. The data analytics engine is configured to process transformed version of the collected data for analyzing one or more data parameters associated with the transformed data to determine relationships and patterns within the transformed data. Further, the data analytics engine is configured to generate prompts related to operational issues associated with the specific domain. The prompts are provided to Large Language Models (LLMs) as an input for generating diagnostic data and insights related to the operational issues. An optimized value of one or more modifiable prompt parameters associated with the generated prompts is determined for customizing the LLMs. One or more domain specific recommendations are provided by the LLM based on the generated diagnostic data and insights for resolving the operational issues.

In various embodiments of the present invention, A generative artificial intelligence-based method for providing an improved end-to-end data analytics tool is provided. The method is implemented by a processor executing instructions stored in a memory. The method comprises collecting data from input unit(s) associated with multiple data sources located at disparate locations. A data quality assessment is performed based on one or more pre-determined criteria. The method comprises processing transformed version of the collected data for analyzing one or more data parameters associated with the transformed data to determine relationships and patterns within the transformed data. Further, the method comprises generating prompts related to operational issues associated with the specific domain. The prompts are provided to Large Language Models (LLMs) as an input for generating diagnostic data and insights related to the operational issues. An optimized value of one or more modifiable prompt parameters associated with the prompts is determined for customizing the LLMs. One or more domain specific recommendations are provided by the LLM based on the generated diagnostic data and insights for resolving the operational issues.

In various embodiments of the present invention, a computer program product is provided. The computer program product comprises a non-transitory computer-readable medium having computer program code stored thereon, the computer-readable program code comprising instructions that, when executed by a processor, causes the processor to collect data from input unit(s) associated with multiple data sources located at disparate locations, wherein a data quality assessment is performed based on one or more pre-determined criteria. Further, transformed version of the collected data is processed for analyzing one or more data parameters associated with the transformed data to determine relationships and patterns within the transformed data. Further, prompts are generated related to operational issues associated with the specific domain. The prompts are provided to Large Language Models (LLMs) as an input for generating diagnostic data and insights related to the operational issues. An optimized value of one or more modifiable prompt parameters associated with the prompts is determined for customizing the LLMs. One or more domain specific recommendations are provided by the LLM based on the generated diagnostic data and insights for resolving the operational issues.

BRIEF DESCRIPTION OF THE ACCOMPANYING DRAWINGS

The present invention is described by way of embodiments illustrated in the accompanying drawings wherein:

FIG. 2 illustrates a screenshot of a Graphical User Interface (GUI) depicting a login interface of an application for carrying out data analytics, in accordance with an embodiment of the present invention;

FIG. 2A illustrates a screenshot of the GUI providing an option to select a particular organization type: in an organizational domain, in accordance with an embodiment of the present invention;

FIG. 2B illustrates a screenshot of the GUI for selecting one or more organizational parameters of interest for visualization as an output, in accordance with an embodiment of the present invention;

Figure 5A:
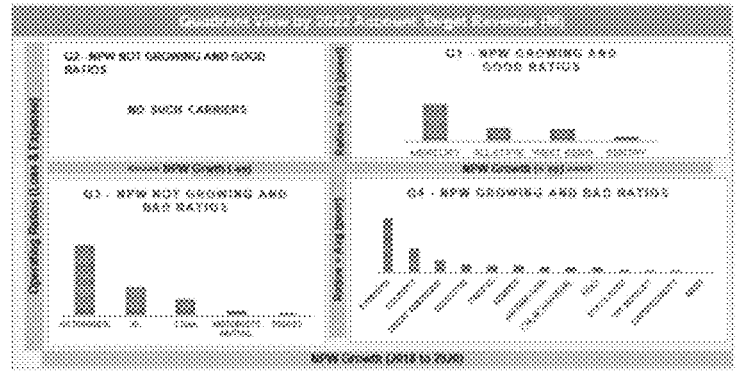
Figure 6A:
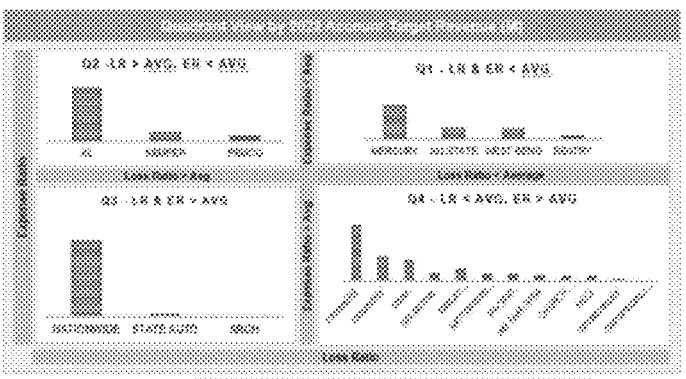
Figure 13:
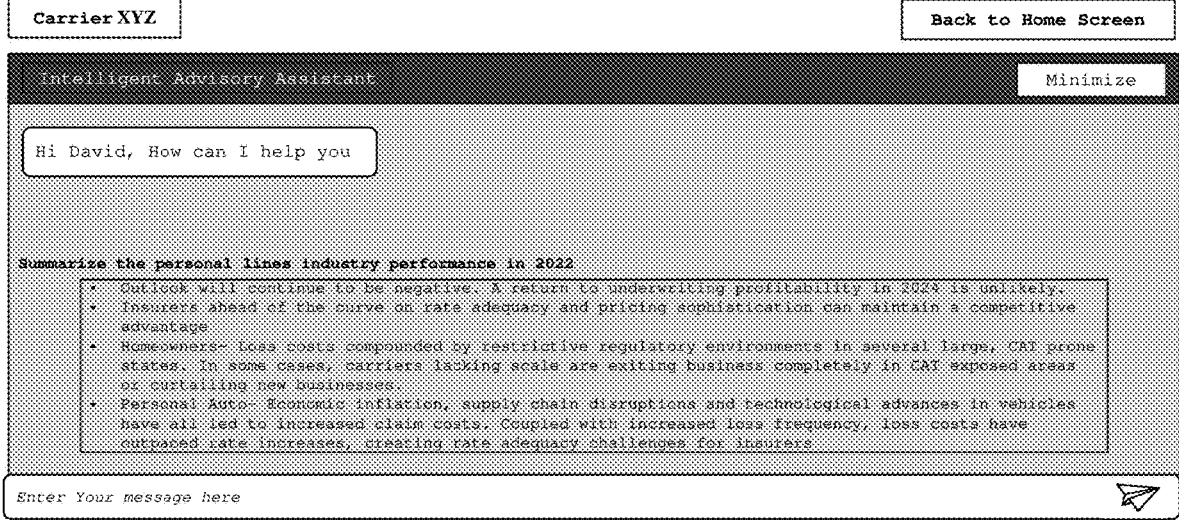
Figure 14:
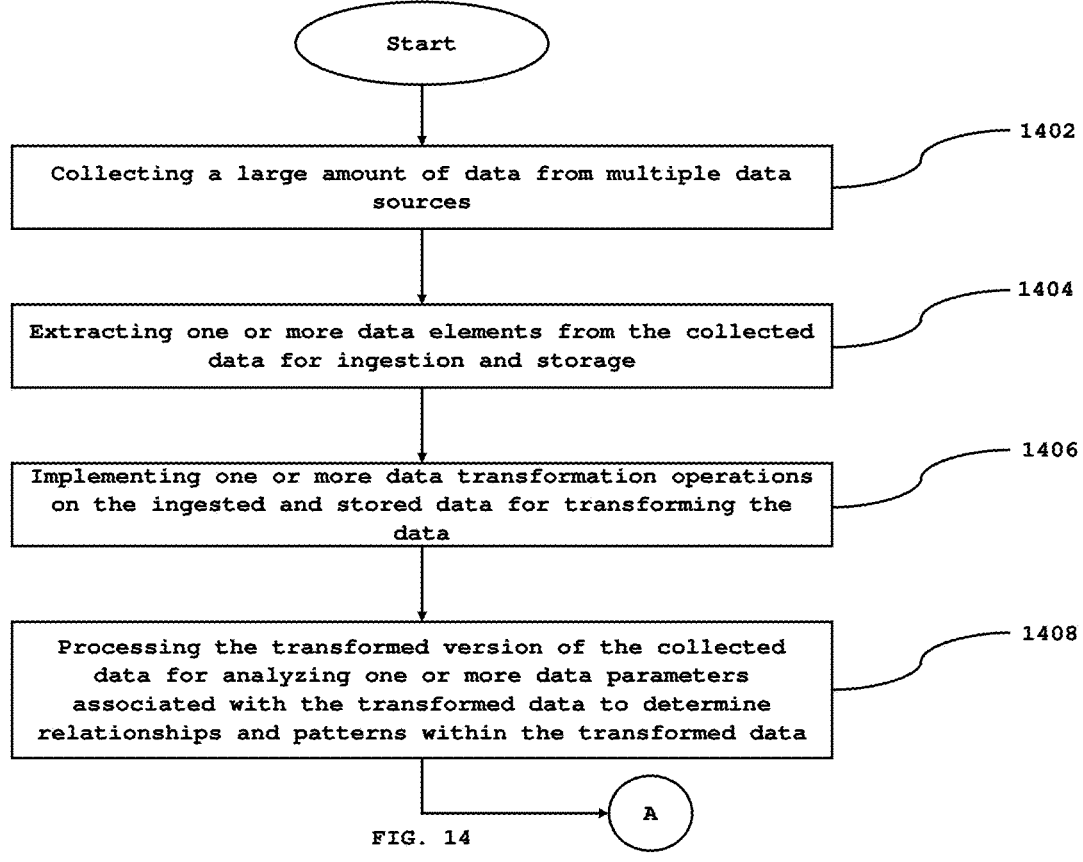
Figure 14A:
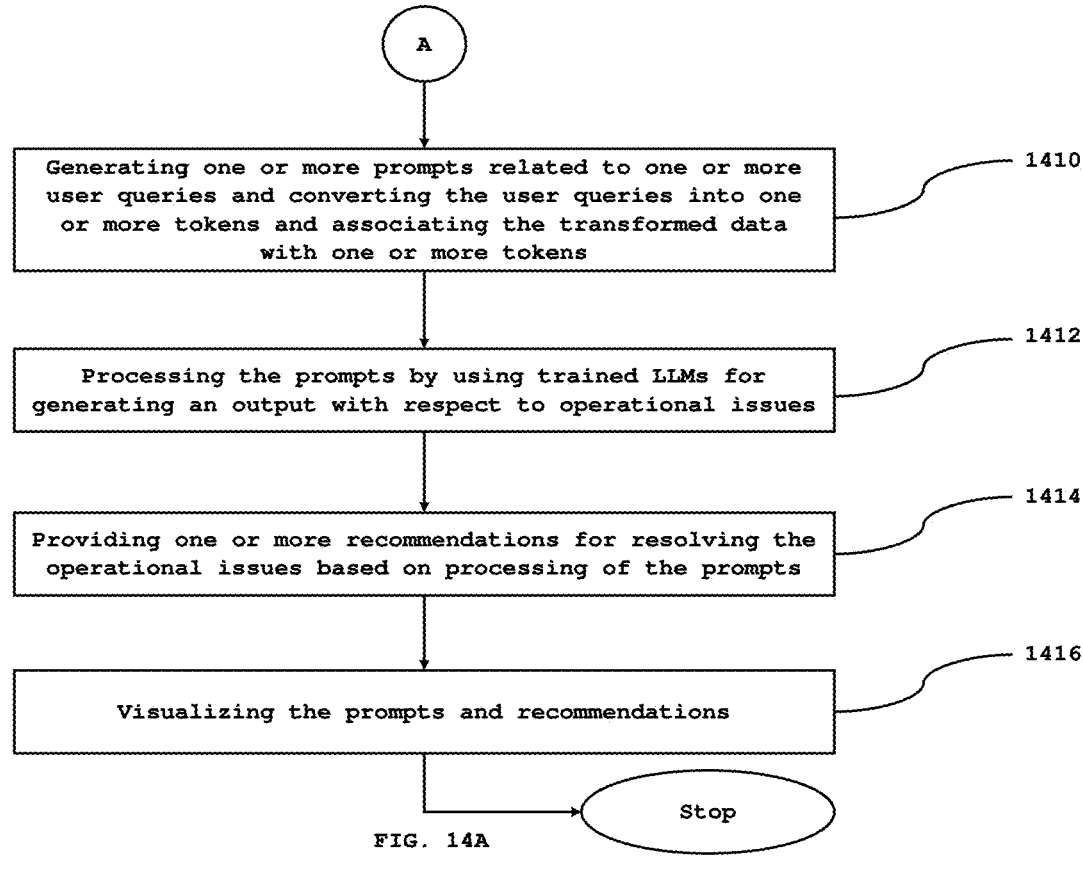
Figure 15:
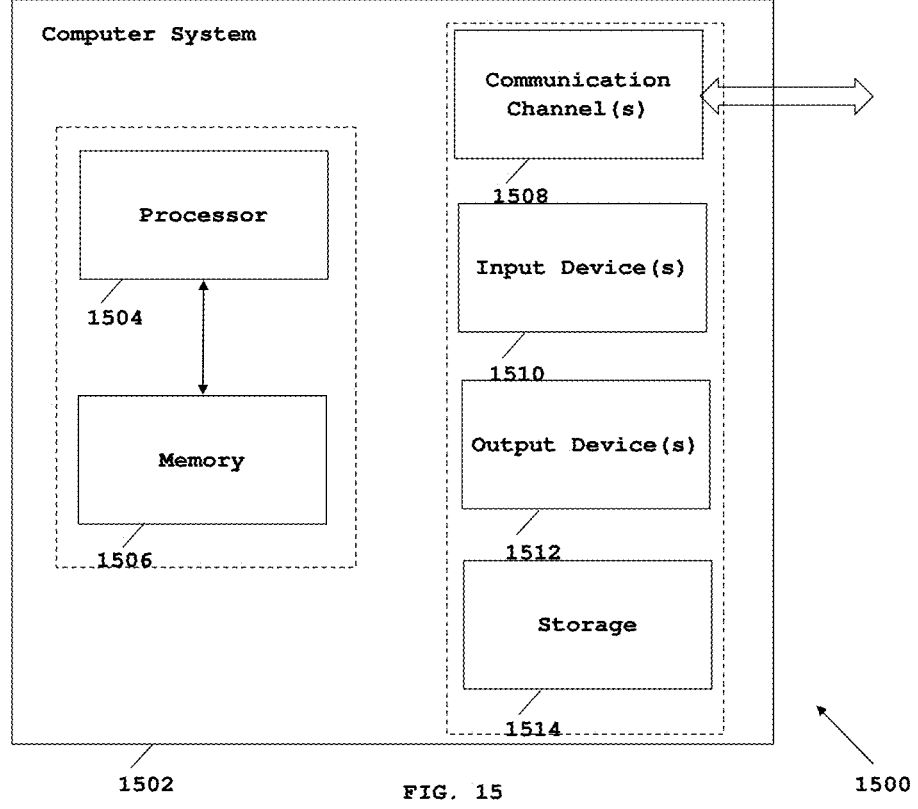

FIG. 3 illustrates a screenshot of the GUI depicting a prompt related to performance summary of an insurance carrier, and FIG. 3A illustrates a screenshot of the GUI depicting an output visualization related to the performance summary of the insurance carrier including charts, and graphs generated by a Business Intelligence (BI) tool rendered on the left side of the GUI and summary and inference generated by a trained LLM on the right side of the GUI, in accordance with an embodiment of the present invention;

FIG. 4 illustrates a screenshot of the GUI depicting a prompt related to financial performance of the insurance carrier with respect to peer group and coverage level, and FIG. 4A illustrates a screenshot of the GUI depicting an output visualization related to financial performance of the insurance carrier with respect to peer group and coverage level including charts, and graphs generated by the BI tool rendered on the left side of the GUI, and summary and inference generated by the trained LLM on the right side of the GUI, in accordance with an embodiment of the present invention;

FIG. 5 illustrates a screenshot of the GUI depicting a prompt related to determining balancing premium growth (top line) and operational metrics (bottom line) by providing a quadrant based categorization of carrier performance, and FIG. 5A illustrates a screenshot of the GUI depicting an output visualization related to determining balancing premium growth (top line) and operational metrics (bottom line) by providing a quadrant based categorization of carrier performance including charts, and graphs generated by the BI tool rendered on the left side of the GUI and summary and inference generated by the trained LLM on the right side of the GUI, in accordance with an embodiment of the present invention;

FIG. 6 illustrates a screenshot of the GUI depicting a prompt related to determining a quadrant based categorization of carrier performance by balancing premium growth (topline) and operational metrics (bottom line) in the form of prompt, and FIG. 6A illustrates a screenshot of the GUI depicting an output visualization related to determining a quadrant based categorization of carrier performance by balancing premium growth (topline) and operational metrics (bottom line) including charts, and graphs generated by the BI tool rendered on the left side of the GUI and summary and inference generated by the trained LLM on the right side of the GUI, in accordance with an embodiment of the present invention;

FIG. 7 illustrates a screenshot of the GUI depicting a prompt related to revenue growth of insurance carrier with respect to peer group in the form of prompts, and FIG. 7A illustrates a screenshot of the GUI depicting an output visualization related to revenue growth of insurance carrier with respect to peer group including charts, and graphs generated by the BI tool rendered on the left side of the GUI and summary and inference generated by the trained LLM on the right side of the GUI, in accordance with an embodiment of the present invention;

FIG. 8 illustrates a screenshot of the GUI depicting a prompt related to operational performance of insurance company with respect to peer group at a company level aggregate, and FIG. 8A illustrates a screenshot of the GUI depicting an output visualization related to operational performance of insurance company with respect to peer groups at a company level aggregate including charts, and graphs generated by the BI tool rendered on the left side of the GUI and summary and inference generated by the trained LLM on the right side of the GUI, in accordance with an embodiment of the present invention;

FIG. 9 illustrates a screenshot of the GUI depicting a prompt related to operational performance of insurance company with respect to peer groups in the form of prompts, and FIG. 9A illustrates a screenshot of the GUI depicting an output visualization related to operational performance of insurance company with respect to peer groups including charts, and graphs generated by the BI tool rendered on the left side of the GUI and summary and inference generated by the trained LLM on the right side of the GUI, in accordance with an embodiment of the present invention;

FIG. 10 illustrates a screenshot of the GUI depicting a prompt related to operational performance of insurance company with respect to peer group, and FIG. 10A illustrates a screenshot of the GUI depicting an output visualization related to operational performance of insurance company with respect to peer group including charts, and graphs generated by the BI tool rendered on the left side of the GUI and summary and inference generated by the trained LLM on the right side of the GUI, in accordance with an embodiment of the present invention;

FIG. 11 illustrates a screenshot of the GUI depicting a prompt related to coverage level operational performance across peer groups, and FIG. 11A illustrates a screenshot of the GUI depicting an output visualization related to coverage level operational performance across peer groups including charts, and graphs generated by the BI tool rendered on the left side of the GUI and summary and inference generated by the trained LLM on the right side of the GUI, in accordance with an embodiment of the present invention;

Figure 12A:
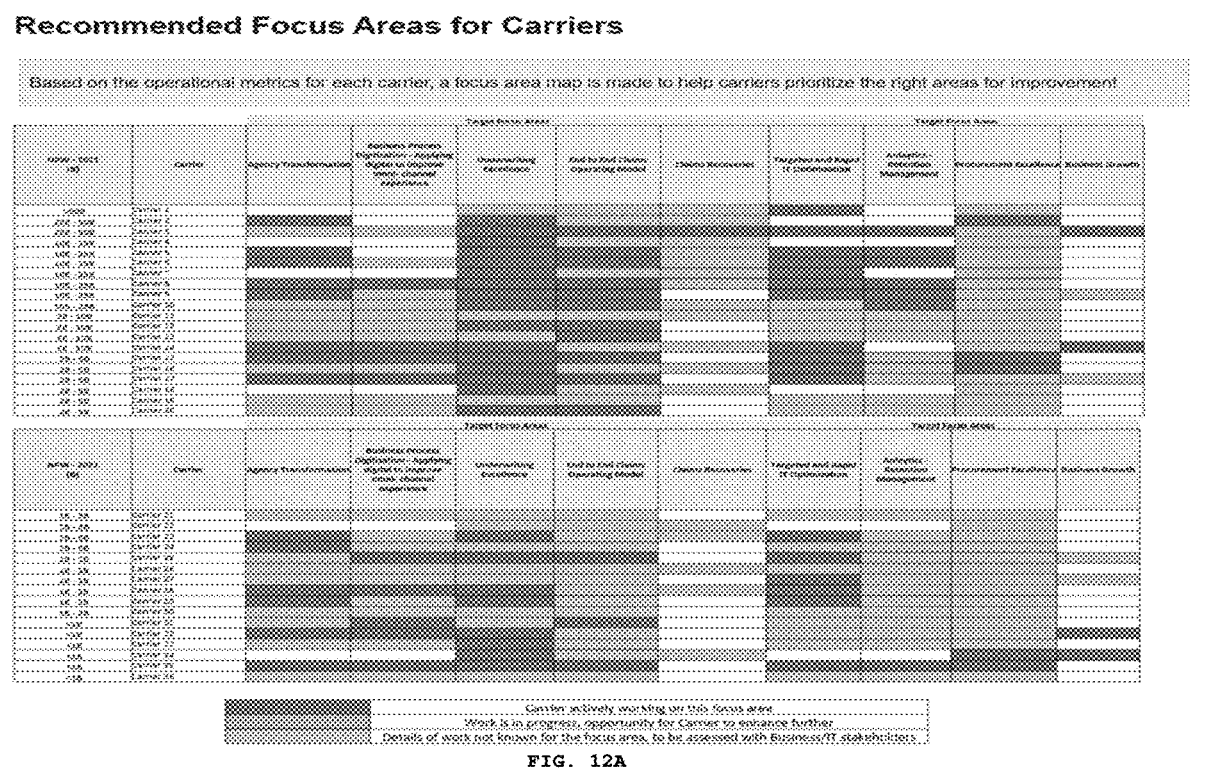

FIG. 12 illustrates a screenshot of the GUI depicting a prompt related to determining performance of companies of similar size with respect to each other, and FIG. 12A and FIG. 12B illustrates a screenshot of the GUI depicting an output visualization related to determining performance of companies of similar size with respect to each other including tables generated by the BI tool rendered on the left side of the GUI and summary and inference generated by the trained LLM on the right side of the GUI respectively, in accordance with an embodiment of the present invention;

FIG. 13 illustrates a screenshot of the GUI depicting user queries provided with respect to the organizational parameters, and FIG. 13A illustrates a screenshot of the GUI depicting advisory reports along with a magnitude of remedial impact for helping organizations undertake remedial decisions, in accordance with an embodiment of the present invention;

FIGS. 14 and 14A illustrates a flowchart depicting a method for providing an improved end-to-end generative artificial intelligence-based data analytics tool, in accordance with an embodiment of the present invention; and FIG. 15 illustrates an exemplary computer system in which various embodiments of the present invention may be implemented.

DETAILED DESCRIPTION OF THE INVENTION

The present invention discloses a system and a method which provides for an improved end-to-end generative artificial intelligence-based data analytics tool. The present invention provides for uniformly analyzing and processing data from multiple sources and of different formats. The present invention provides for implementing a collaborated approach for effectively addressing data analysis issues. Further, the present invention discloses and suggests a system and a method which provides for an end-to-end data analytics tool which covers diagnostics to recommendations aspects for organizational level issues. Also, the present invention discloses a system and a method which provides for efficiently analyzing complex operational metrics associated with organizations. Furthermore, the present invention discloses a system and a method which provides for dissecting and aggregating data at multiple levels with intuitive navigation and a configurable workflow. Yet further, the present invention discloses a system and a method which provides for enhanced visualization and chat capabilities related to data analytics.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
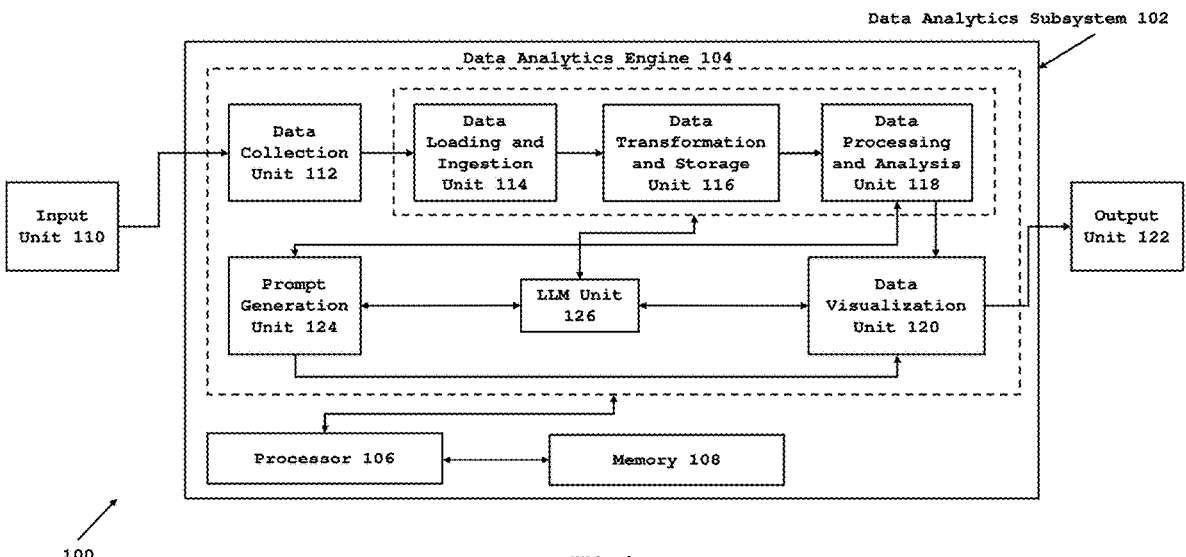
FIG. 1 is a block diagram of a generative artificial intelligence (Gen AI)-based system for providing an improved end-to-end data analytics tool, in accordance with an embodiment of the present invention.

FIG. 1 is a detailed block diagram of a system 100 for providing an improved end-to-end generative artificial intelligence-based data analytics tool, in accordance with various embodiments of the present invention. Referring to FIG. 1, in an embodiment of the present invention, the system 100 comprises a data analytics subsystem 102, an input unit 110, and an output unit 122. In an exemplary embodiment of the present invention, the output unit 122 is an electronic device associated with a user such as, but is not limited to, a smartphone, a mobile phone, a computer and a laptop. The input unit 110, and the output unit 122 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a local area network (LAN), a metropolitan area network (MAN) and a wide area network (WAN).

In an embodiment of the present invention, the subsystem 102 is configured to automatically capture data from disparate data sources and of different formats for carrying out an intelligent data analytics operation. The subsystem 102 generates and provides detailed data trends, diagnose source of operational issues, and leverage learnings from broader industry eco-system to provide effective recommendations for growth and optimizing operational performance. Further, the subsystem 102 employs Generative Artificial Intelligence (Gen AI) techniques at various stages of data analytics for providing intelligent recommendations and conversational capabilities. Further, the subsystem 102 generates detailed insights related data to analytics for visualization.

In an embodiment of the present invention, the subsystem 102 comprises a data analytics engine 104 (engine 104), a processor 106, and a memory 108. In various embodiments of the present invention, the engine 104 has multiple units which work in conjunction with each other for carrying out improved the end-to-end data analytics. The various units of the engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as Software as a Service (SaaS) over a communication network.

In another embodiment of the present invention, the subsystem 102 may be implemented as a client-server architecture or in an application-based environment. In this embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the engine 104 comprises a data collection unit 112, a data loading and ingestion unit 114, a data transformation and storage unit 116, a data processing and analysis unit 118, a prompt generation unit 124, a Large Language Model (LLM) unit 126 and a data visualization unit 120.

In operation, in an embodiment of the present invention, the data collection unit 112 is configured to collect large amounts of data from multiple data sources via the input unit(s) 110. The input unit(s) 110 is associated with the multiple data sources which are located at disparate locations. The data sources may include, but are not limited to, data files, databases associated with various organizations, historical data, websites, communication applications, and social media. The data collected is in multiple formats such as structured data format and unstructured data format. The structured data is in a pre-defined format such as, in the form of tables with well-defined columns. The unstructured data is in varied and divergent formats such as, but not limited to, published reports, news articles analysis provided by organizations, and interview transcripts of organization's executives. In an example, if the organization relates to an insurance domain, then the structured data collected includes, but is not limited to, organization name, NAIC organization number, state of domicile, year of incorporation, coverage code, coverage description, premiums written (NPW), premiums earned (NPE), dividend paid to policy holders, losses incurred, loss adjustment expenses, unpaid losses, broker expenses, tax and license fee incurred, investment gains, total profit/loss, losses incurred to NPE, losses and loss adjustment expense incurred to NPE, total underwriting expense incurred to NPW, and combined ratio.

In another example, the unstructured data related to the organization includes, but is not limited to, documents providing details of target focus areas for operational performance improvement, recommended IT initiatives based on the focus areas for operational performance improvement, projected impact on target objectives based on the recommended IT initiatives, validated list of third-party providers associated with technology expertise, technology trends in industry, performance improvement initiatives taken by peer group companies, perspectives on innovation and research, financial performance reports, earnings call transcripts, inputs from industry leaders on organizational outlook, peer group performance comparison, and best practices. In an embodiment of the present invention, a reference tag associated with the data source is fetched by the data collection unit 112 along with collected data for providing integrity and traceability of the collected data. In an exemplary embodiment of the present invention, the data from disparate sources is consolidated in the data collection unit 112 by using a storage service tool such as Amazon Web Services® (AWS) Simplified Storage Service (S3) in the form of buckets. In an embodiment of the present invention, the data collection unit 112 employs privacy enhancing techniques for carrying out data masking and data encryption to protect data during processing and usage.

In an embodiment of the present invention, the data collection unit 112 performs a data quality assessment based on one or more pre-determined criteria for ensuring quality of the collected data. The one or more pre-determined criteria associated with the quality of the collected data includes, but are not limited to, completeness of the collected data comprising diverse and comprehensive range of data scenarios, accuracy of the collected data including updated and representative data, accurate timeliness associated with the collected data providing age of data in the data sources, consistency of the collected data including maintaining coherence and consistency in the data life cycle, and data lineage including tracking of the data sources and applicable license restrictions.

In an embodiment of the preset invention, the data loading and ingestion unit 114 is configured to receive the collected data from the data collection unit 112 for extracting one or more data elements from the collected data relating to structured data format and the unstructured data format for loading and ingesting the extracted data. The data elements relate to relational data associated with the structured data format and non-relational data associated with the unstructured data format. The data loading and ingestion unit 114 loads and ingests the one or more data elements associated with the collected data based on the type of data format. In an exemplary embodiment of the present invention, the data elements extracted from the structured data format are loaded into database tables for ingestion. In an embodiment of the present invention, the data loading and ingestion unit 114 implements an Optical Character Recognition (OCR) technique for recognizing one or more variables associated with the data elements from the data present in the unstructured format based on predefined tags and rules and stores the extracted data elements in database tables along with the structured data elements for ingestion. In another exemplary embodiment of the preset invention, the data loading and ingestion unit 114 communicates with a combination of relational databases and vector databases for storing the extracted data. In an exemplary embodiment of the present invention, the relational database is loaded with multiple relational data associated with the structured data tables of a Microsoft PowerBI® tool. Non-relational data from unstructured data sets are loaded into an Azure® AI search vector database in the form of vector embeddings.

In an embodiment of the present invention, the data transformation and storage unit 116 is configured to receive the loaded and ingested data from the data loading and ingestion unit 114. The data transformation and storage unit 116 implements one or more data transformation operations on the ingested and stored data for transforming the data. The data transformation operations include, but are not limited to, data cleaning, data validating, and data enrichment. The data transformation operation may be performed manually or automatically. Further, the data transformation and storage unit 116 implements the data transformation operation by determining the data, mapping modifications in the data, extracting data, transforming data, reviewing the transformed data, and storing the transformed data. The data transformation operation transforms the data into a structured, uniformly formatted, accessible, understandable, and actionable for analysis. In an exemplary embodiment of the present invention, the data transformation and storage unit 116 stores the transformed relational data into Microsoft PowerBI® tool and non-relational data into Azure® AI vector database for subsequent data processing and creation of visualizations. Further, user level access permissions are defined at this level. The data transformation and storage unit 116 performs one or more data security operations including, but are not limited to, organizing and labelling data, encrypting data, providing access controls, and setting up audit logging.

In an embodiment of the present invention, the data transformation and storage unit 116 performs a data tracking operation during data storage based on pre-determined data tracking parameters including, but not limited to, recording data source name and data collection date. The data source name is recorded by providing data source citation and documentation of data origins through cataloguing. A reference to origin of datasets, databases and other data sources is maintained along with the stored data. The data transformation and storage unit 116 performs the data tracking operation for tracking data origin (such as URLs, third party reports, etc.), details of data collection process (such as via emails, websites, social media, etc.), and the implemented one or more data transformation operations (such as, transformation logic). Advantageously, data tracking operation aids to provide transparency of data source during display on UI, as the data is collected from multiple data sources in varying formats. The visualizations and inferences presented on the UI renders data source references at the bottom of the UI screen. In another embodiment of the present invention, the data transformation and storage unit 116 employs one or more LLMs by communicating with the LLM unit 126 for processing pre-defined prompt queries that are executed offline to provide tracking of data sources.

In another embodiment of the present invention, the data transformation and storage unit 116 carries out continuous monitoring of data sources, as the data sources get periodically refreshed with time. For example, financial performance reports get updated every quarter or year or recommendations on technology initiatives are made to improve performance. In an embodiment of the present invention, refreshing of data is initiated periodically by the data transformation and storage unit 116 to collect current and up-to-date data from data sources. In an embodiment of the present invention, the LLM is retrained along with refreshing of data and the pre-determined data tracking parameters are also refreshed. In an exemplary embodiment of the present invention, the data transformation and storage unit 116 generates an audit report at regular intervals for providing various data sources along with URLs, author names and ingestion dates for periodic traceability compliance checks and sign-off by auditors.

In an embodiment of the present invention, the data processing and analysis unit 118 is configured to receive the transformed version of the collected data from the data transformation and storage unit 116. The data processing and analysis unit 118 processes the transformed version of the collected data for analyzing one or more data parameters associated with the transformed data to determine relationships and patterns within the transformed data by implementing one or more statistical and logical techniques. In an example, if the organization relates to an insurance domain, then the data parameters relating to topline includes net written premium, net earned premium, direct written premium, direct earned premium, amount paid by the carrier for reinsurance, loss reserves to be maintained, etc. and data parameters relating to bottom line includes losses paid to policyholders, expenses paid by carrier for loss adjustments, defence and cost containment expenses, field supervision and collection expenses, commissions paid to agents, and license fees. Further, profitability is computed by determining ratio of total revenue to total losses and expenses. Further, one or more primary metrics associated with the organization are computed to quantify relationship between underlying variables. In the insurance domain, the one or more primary metrics include, but are not limited to, loss ratio, expense ratio, and combined ratio. Loss ratio is computed as the ratio of total amount expended for losses (sum of loss amount paid, defence and cost containment expenses and loss adjustment expenses) to net premium earned. Expense ratio is computed as a ratio of total expenses incurred to acquire new business (total field supervision and collection expenses, commissions paid to agents, license fees) to net premium written. Combined ratio is computed as a total of loss ratio and expense ratio and represents the percentage of revenue that moved out of the organization in the form of losses paid and underwriting expenses. The computed ratios are then compared to organization's standards to determine extent of deviation at the organization's level from the ideal standards. The ratios are computed at multiple levels such as at enterprise level (highest), and line of business and level coverage (lowest) for aiding the organization to determine the areas that need improvement to make positive impact on profitable growth.

In another exemplary embodiment of the present invention, one or more visual outputs and inferences are generated by the data visualization unit 120 by analyzing the one or more primary metrics associated with organizations operational aspects and may include, but are not limited to, performance summary of an organization, growth of the organization, organization's operational data, organization's operational deficiencies, comparison of an organization's operations and performance with respect to other peer group organizations and broader industry, and IT initiatives to be implemented for improving efficiency of the organization's operation.

In an embodiment of the present invention, the prompt generation unit 124 is configured to receive one or more user inputs in the form of user queries from the input unit 110 via the UI for generating one or more prompts related to one or more user queries. The user queries relate to determining one or more operational parameters associated with the organization. The prompt generation unit 124 converts the user queries into one or more tokens by implementing a tokenization operation. The prompt generation unit 124 fetches the transformed data (comprising the structured and unstructured data) from the data processing and analysis unit 118 and associates the transformed data with the tokens by employing a Retrieval Augmented Generation (RAG) technique. The RAG technique combines the LLM's capabilities with the external data sources to generate a more informed and contextually rich response and aids in generating impactful prompts for the user queries that require real-time data or domain specific expertise to be incorporated into the LLM. In an exemplary embodiment of the present invention, the prompts may be related to investigation of operational performance issues of an organization, the underlying root causes and potential remedial actions needed and are used to train the LLMs. In an example, if the organization relates to an insurance domain, the prompts used to train the LLM includes, but are not limited to, how did a carrier perform last year with respect to primary metrics, how do the primary metrics perform as compared to insurance industry average benchmarks, how is the organization's performance as compared to its closest peer group companies, what is the most important primary metric that the organization can target for maximum positive impact for profitable growth, what potential remedial IT initiatives can the organization take up to improve that primary metric, what are other carriers doing to improve the primary metrics associate with them, and what kind of eco system partnerships are being leveraged by the organization to improve performance.

In an embodiment of the present invention, the generated prompts are associated with one or more pre-determined prompt elements including, but are not limited to, instructions, context, output indicator and expected output with respect to the one or more operational parameters a associated with the operational performance of the organization. The prompts along with the prompt responses are provided to the LLMs associated with the LLM unit 126 as an input by the prompt generation unit 124 for training the LLM and generating one or more outputs including, but not limited to, one or more diagnostics data, determine patterns related to causes of performance issues, generate insights related to operational efficiencies of the organization and potential remedial actions to improve the organization's performance. In an exemplary embodiment of the present invention, the prompt generation techniques used for training the LLM includes, but are not limited to, a zero-shot prompting technique in which a task is provided to the LLM without providing examples or explicit training for that specific task, thereby relying fully on LLM's knowledge, a few-shots prompting technique in which examples of a task are provided to the LLM to guide the output, a chain of thought prompting technique in which the task is divided into a sequence of reasoning steps providing structure and coherence to generated output, a negative prompting technique in which explicit instructions are provided to the LLM regarding what not to include in its response to avoid unwanted content, thereby maintaining focus and enhancing clarity in output.

In an embodiment of the present invention, prior to generating prompts, the prompt generation unit 124 generates vector embeddings to capture specific and relevant domain knowledge from the data sources. The vector embeddings are used to enhance the user inputs provided as queries to generate an augmented and enriched prompt comprising data from the data sources. In an exemplary embodiment of invention, the present the vector embeddings are generated by the prompt generation unit 124 by using tools such as text split skill to break each external data source into multiple smaller chunks, and then the chunks are parsed. Each chunk comprises text, images or audio. Further, each vector embedding is an array of numerical values consisting of a token ID number and a token name. The generated vector embeddings have a high dimensionality to capture user behavioral features such as semantic meaning, role and sentiment. In an embodiment of the present invention, a vector database (now shown) is generated for storing the vector embeddings, which is dynamic in nature and is refreshed either manually or automatically at regular intervals of time whenever the data sources are updated. In an exemplary embodiment of the present invention, the vector databases may include, but are not limited to, Azure AI Search, Amazon OpenSearch Service, Pinecone, Mongo DB, Amazon Redis, and Amazon RDS for PostgreSQL. Advantageously, the vector embeddings effectively parse various data sources to efficiently capture the data specific nuances such as, target focus areas for operational performance improvement, recommended IT initiatives based on target focus areas, projected impact on operational metrics based on suggested IT initiatives, validated lists of third-party vendors for niche technology partners and Commercial-Off-The-Shelf (COTS) packaged products, technology trends for the specific organization, IT initiatives being adapted among peer group organizations, innovation and state-of-the-art research findings from collaboration with academic institutions, reports from reputed industry bodies, expert inputs and perspectives related to organization's vision, and best practices from peer group performance comparison.

In an embodiment of the present invention, the prompt generation unit 124 uses the vector embeddings for generating intelligent prompts by using at least one or more prompt generation techniques and one or more prompt generation templates. In an embodiment of the present invention, the prompt generation unit 124 implements prompt generation techniques including, but are not limited to, an unsupervised learning technique and a semi-supervised learning technique to develop, generate and optimize prompts to enhance output of the LLM. Further, the prompt generation unit 124 employees the prompt templates to simplify and standardize generation of the prompts. The prompt template comprises at least four prompt elements including "instructions" providing description of the organizational parameter and how the LLM should perform, "context" with data needed to guide the LLM, "input data" for which a response is needed, and an "output indicator" providing the output type or format. Further, the prompt elements may be selected optionally depending upon the nature and purpose of the prompt.

In an exemplary embodiment of the present invention, the generated prompts are classified based on the intent, including, but not limited to, "descriptive type prompts", "diagnostic type prompts" and "prescriptive type prompts". The "descriptive type prompts" are generated and developed to determine an exact response describing the performance of the organization in terms of various primary metrics and inferences and summarizes data quantitatively by statically presenting the data. The "diagnostic type prompts" are generated and developed to determine causes related to organizational performance issues. The "prescriptive type prompts" are generated and developed to provide recommendations for resolving the organizational performance issues. The generated prompts are relevant to the organization's domain and effectively customize and train the LLMs to generate more relevant and accurate responses specific to the organization's context and issues. The prompt generation unit 124 develops, generates, and optimizes prompts to enhance the output of LLMs for efficiently determining trends, correlations, patterns, outliers, and variations associated with the transformed data. The correlations, patterns, outliers, and variations associated with data are determined by using one or more data analysis techniques, such as, but are not limited to, a descriptive analysis technique, a diagnostic analysis technique, a predictive analysis technique, and a prescriptive analysis technique.

In an embodiment of the present invention, the LLM unit 126 is configured to receive the generated prompts from the prompt generation unit 124. In an exemplary embodiment of the present invention, the LLM unit 126 is configured with one or more custom LLMs such as, OpenAI GPT 4®, Meta®, Amazon Bedrock®, Google Gemini®, Anthropic®, etc. The prompts are processed by the LLM unit 126 to generate a particular output with respect to the organization's operational issues. The LLMs associated with the LLM unit 126 are trained using the generated prompts for generating the output comprising recommendations relating to the diagnostic data and insights with respect to the organization's operational issues. In an embodiment of the present invention, the LLM unit 126 improves performance of the LLMs for enhancing the response quality of the LLMs by employing modifiable prompt parameters that control the randomness and diversity of output provided by the LLMs. The prompt parameters may include, but are not limited to, system prompts, temperature parameter, top P parameter, top K parameter, length of the prompt, and stop sequences of the prompt. The "system prompts" indicates working of the LLM based on assuming role or actor persona by the LLM for processing the specific prompt, the "temperature" parameter determines creativity of the LLM output and is in a range of 0 to 1, as such a higher value of temperature output leads to more creative LLM output, the "top P" parameter determines percentage of similar words in the prompt and is in a range of 0 to 1, and as such higher value of "top P" parameter leads to a more diverse outputs from the LLM, the "top K" parameter determines number of probable words in the prompt and as such a lower value of top K" parameter leads to a coherent output from the LLM, the "length" parameter determines maximum length of output from the LLM and the "stop sequences" parameter signal the LLM to stop generating the outputs. In an embodiment of the present invention, the LLM unit 126 determines an optimal value of the prompt parameters based on iterative testing of various prompts and generated responses and optimal values of the prompt parameters are used for customizing the LLMs for generating accurate, context rich and domain relevant LLM responses.

In an embodiment of the present invention, the LLM unit 126 computes effectiveness of LIM training by determining performance of the LLM based on one or more LLM variables including, but are not limited to, LLM accuracy, precision, recall, F1 score, and latency. The "LLM accuracy" variable provides ratio of positive predictions to total predictions. The "precision" variable indicates the ratio of true positive predictions of the LLMs (i.e., correct vs incorrect positive predictions). The "recall" parameter computes ratio of true positive predictions of the LLMs as compared to the actual positive predictions. The "F1 score" variable determines average of "precision" variable and "recall" variable for a suitable measure. The "latency" variable computes time taken by the LLM to generate the response.

In an embodiment of the present invention, the LLM unit 126 provides one or more organizational specific recommendations based on processing of the prompts associated with the diagnostic data and insights for resolving the operational issues of the organization for increasing and optimizing operational efficiency of the organizations. The recommendations may include, but are not limited to, organization's performance analysis, advisory summary and recommendations of target focus areas. In an example, if the organization relates to an insurance domain, and its growth with respect to other peer organizations is required to be determined, the data processing and analysis unit 118 communicates with the prompt generation unit 124 to determine the current growth rate of the organization with respect to other peer organizations. In an event, the organization's growth rate is low, then a diagnostic data and insights are provided by the prompt generation unit 124 for increasing the organization's growth rate. Further, the recommendation is provided by the LLM unit 126 for implementing the diagnostic data and insights for increasing organization's growth rate with respect to the peer organizations.

In an embodiment of the present invention, the data visualization unit 120 is configured to receive the generated prompts from the prompt generation unit 124 for providing visualization of the generated prompt elements associated with the prompts via the output unit 122. The data visualization unit 120 provides visualization of recommendations relating to the diagnostic data and insights generated by the LLM unit 126 by processing the prompts via the output unit 122. Also, the data visualization unit 120 provides visualization of the one or more organizational specific recommendations relating to the diagnostic data and insights for increasing and optimizing operational efficiency of the organizations on the output unit 122.

In an embodiment of the present invention, the data visualization unit 120 communicates with the data processing and analysis unit 118 for providing comprehensive visualization of the one or more organizational parameters in one or more visualization forms such as, charts, graphs, maps, pie charts, bar charts, histograms, line graphs and dashboards on a User Interface (UI) associated with the output unit 122 by using BI tools and a visualization tool. Examples of visualization tools include, but are not limited to, Microsoft PowerBI®, Tableau®, Cognos®, Jupyter®, and Amazon QuickSight®. In another embodiment of the present invention, the data visualization unit 120 communicates with the LLM unit 126 for providing inference for each organizational parameter in the form of summary and observations by processing the visualization forms associated with the organization's operational performance metrics. In an exemplary embodiment of the present invention, the Microsoft PowerBI® is used to define, create and manage various visualizations. One or more components associated with the Microsoft PowerBI® includes a powerBI desktop, a power BI gateway, a power query editor, a power BI service and a power BI report server. The powerBI desktop component is used to connect various data sources and export external data into the subsystem 104 to generate reports and visualize data. The powerBI desktop component has native connectors for various types of external data sources, including flat files, databases, online applications and services. Further, data sources are configured and connected to export data by using "get data" option on the powerBI desktop interface. The powerBI gateway component is used as a bridge for connecting the powerBI service to on-premises data sources. The powerBI query editor component is used to perform various data aggregations and calculations for visualizations. Further, powerBI desktop's capabilities are leveraged to create one or more data visualization types such as charts, graphs, tables, etc. and highlight the important insights from such visualizations. Further, the UI is split into multiple "tiles" to provide data visualization types. The visualizations rendered by powerBI desktop are accessed using the powerBI service over the cloud for accessing from any location through a web browser. The data visualization unit 120 uses powerBI report server as a central repository to manage all the visualizations and track the primary metrics associated with organization's performance.

In an exemplary embodiment of the present invention, if the organization relates to an insurance domain, then the output unit 122 renders the one or more parameters related to the organization's performance on the UI along with the prompts needed to train the LLMs. The user logs in by providing his/her credentials on an application or using a Universal Resource Locator (URL) rendered on the GUI, selects the insurance carrier of interest and selects the organizational parameters of interest for visualization as output, as illustrated in FIGS. 2, 2A and 2B respectively.

In an exemplary embodiment of the present invention, the GUI renders an output related to performance summary of an insurance carrier in the form of prompts, which are subsequently used for training the LLM and generating inferences, as illustrated in FIG. 3. The output visualizations related to the performance summary of the insurance carrier includes charts, and graphs generated by the Microsoft Power Business Intelligence (BI) tool is rendered on the left side of the UI and summary and inferences generated by trained LLM through the invocation of pre-defined prompts specific to the context are on the right side of the GUI, as illustrated in FIG. 3A. The visualization aids in providing a comprehensive understanding of the insurance carrier's issues, potential underlying causes and suggested remedial actions that the insurance carrier may implement. For example, if the visualization on left side of the UI renders performance of the insurance carrier with respect to managing expenses as compared to the peer group, the right side of UI renders intelligent inferences with respect to the management of expenses by the insurance carrier, the steps taken by the insurance carrier to improve the primary metrics and render advice for the insurance carrier for better performance.

In another exemplary embodiment of the present invention, the GUI renders an output related to financial performance of the insurance carrier with respect to peer group and coverage level in the form of prompts, which are subsequently used for training the LLM and generating inferences, as illustrated in FIG. 4. The output visualizations related to financial performance of the insurance carrier with respect to peer group and coverage level includes graphs generated by the BI tool are rendered on the left side of the UI and summary and inference generated by the trained LLM are rendered on the right side of the GUI, as illustrated in FIG. 4A.

In another exemplary embodiment of the present invention, the GUI renders an output related to depicting efficiency of the insurance carrier for balancing revenue growth (top line) and operational profit margins (bottom line) through a unique quadrant-based categorization of carrier's performance. Appropriate prompts are generated for training the LLM and generating the inferences, as illustrated in FIG. 5. The visualization renders a comprehensive scoring mechanism to classify organizations into four quadrants based on efficiency of the organization for balancing the topline growth (revenue) without losing focus on bottom-line efficiency (profit margin). The first quadrant classifies carriers by determining that operational metrics are in control and below industry averages, and year over year (YoY) revenue growth, the second quadrant classifies insurance carriers by determining that operational metrics are in control and below the industry averages, however, without the YoY revenue growth, the third quadrant classifies insurance carriers by determining that operational metrics are not in control and above the industry averages, and without YoY revenue growth and the fourth quadrant classifies insurance carriers by determining that operational metrics are not in control and revenue is growing above the industry average YoY revenue growth. As such, the first quadrant is the ideal quadrant for carriers to target and the third quadrant is the worse quadrant to be in. In an exemplary embodiment of the present invention, the insurance carriers are classified into four quadrants based on the scoring criteria. If loss ratio and expense ratio are less than the insurance industry average values and the carrier is growing top line revenue YoY, such carriers are mapped to first quadrant. Within the first quadrant, carriers are ranked in ascending order of combined ratio. The insurance carrier with the lowest combined ratio is ranked as first (i.e., best carrier) followed by subsequent carriers ranked in increasing order of the combined ratio. The first quadrant is the most desirable outcome as it represents revenue growth along with healthy profit margins. If loss ratio and expense ratio are both less than the insurance industry average values, but there is no topline growth, such carriers are mapped to second quadrant. If both ratios are worse (greater) than average and YoY business growth is less than the insurance industry average growth, such carriers are mapped to third quadrant. The third quadrant represents the most undesirable outcome as such insurance carriers are at risk of losing business to competition due to lack of business growth and increasing losses. Within the third quadrant, carriers are ranked based on the combined ratio. The insurance carrier with the lowest combined ratio is ranked as first (i.e., the best carrier within that quadrant) followed by subsequent carriers ranked in ascending order of the combined ratio. Further, if one or both operational ratios are greater than average and business growth is greater than the insurance industry's average growth, then such carriers are mapped to fourth quadrant. Within the fourth quadrant, carriers are ranked in ascending order of the combined ratio. The insurance carrier with the lowest combined ratio is ranked as first (i.e., best carrier within that quadrant) followed by subsequent carriers ranked in increasing order of Combined ratio. The LLM unit 126 provides appropriate recommendations as per each carrier's quadrant to optimize underwriting expenses and/or for better management of losses. The output visualization related to balancing premium growth (top line) and operational metrics (bottom line) by providing quadrant-based categorization of carrier performance includes graphs generated by the BI tool which is rendered on the left side of the UI and summary and inference generated by the trained LLM are rendered on the right side of the UI, as illustrated in FIG. 5A.

In another exemplary embodiment of the present invention, the GUI renders an output relating to management of operational expenses by the organization, leading to profitable margins through categorization a unique quadrant-based of organization's performance. The GUI renders an output by categorizing operational expenses into two types including, but not limited to, new business acquisition related expenses (customer acquisition, cross sell, up sell) and the execution costs (raw material procurement, processing or assembly expenses, business running expenses). Appropriate prompts are generated, which are subsequently used for training the LLM and generating inferences, as illustrated in FIG. 6. A comprehensive scoring mechanism is defined to classify organizations into four quadrants based on the health of operational expenses management. In an exemplary embodiment of the present invention, if the organization relates to an insurance domain, insurance carriers are classified into the four quadrants based on the scoring criteria as outlined below. If loss ratio and expense ratio are both less than the insurance industry average values (most desirable outcome since the losses paid and expenses incurred are less than industry average), such carriers are mapped to first quadrant. Within the first quadrant, carriers are ranked based on combined ratio. The organization with the lowest combined ratio is ranked as #1 (best carrier) followed by subsequent carriers ranked in ascending order of Combined ratio. If loss ratio alone is greater than average and expense ratio is less than the insurance industry average values, such carriers are mapped to second quadrant. Within the second quadrant, carriers are ranked based on combined ratio. The organization with the lowest combined ratio is ranked as #1 (best carrier within that quadrant) followed by subsequent carriers ranked in ascending order of Combined ratio. Such carriers would need to focus on loss control measures. If loss ratio and expense ratio are both greater than the insurance industry average values (least desirable outcome since the losses paid and expenses incurred are greater than industry average), such carriers are mapped to third quadrant. Within the third quadrant, carriers are ranked based on a combined ratio. The organization with the lowest combined ratio is ranked as first (best carrier in that quadrant) followed by subsequent carriers ranked in ascending order of Combined ratio. If the expense ratio alone is greater than average and loss ratio is less than the insurance industry average, such carriers are mapped to fourth quadrant. Within the fourth quadrant, carriers are ranked based on combined ratio. The organization with the lowest combined ratio is ranked as first (best carrier within that quadrant) followed by subsequent carriers ranked in ascending order of Combined ratio. Such Carriers would need to focus on controlling new business acquisition related costs. In summary, the first quadrant classifies insurance carriers by determining that loss management is good and expenses are under control, the second quadrant classifies insurance carriers by determining that loss management is not good and expenses are under control, the third quadrant classifies insurance carriers by determining that loss management is not good and expenses are out of control and the fourth quadrant classifies insurance carriers by determining that loss management is good and expenses are out of control. The first quadrant is the ideal quadrant for carriers to target and the third quadrant is the unpreferred quadrant. The LLM unit 126 provides appropriate recommendations as per each carrier's quadrant to optimize underwriting expenses and/or for better management of losses. The output visualization related to quadrant-based categorization of carrier performance by balancing premium growth (topline) and operational metrics (bottom line) includes graphs generated by the BI tool which is rendered on the left side of the UI and summary and inference generated by the trained LLM are rendered on the right side of the UI, as illustrated in FIG. 6A.

In another exemplary embodiment of the present invention, the UI renders an output related to revenue growth of insurance carriers with respect to peer group in the form of prompts, which are subsequently used for training the LLM and generating inferences, as illustrated in FIG. 7. In an example, for a selected time period, the LLM unit 126 computes a cumulative % growth in net written premium (NPW) for the specific carrier and also for the peer group carriers. This aids the insurance carrier to determine their own growth with respect to others and provides further analysis on deviations from the average growth. The output visualization related to revenue growth of insurance carriers with respect to peer group includes graphs generated by the BI tool are rendered on the left side of the UI and summary and inference generated by the trained LLM are rendered on the right side of the UI, as illustrated in FIG. 7A.

In yet another exemplary embodiment of the present invention, the UI renders an output related to operational performance of insurance company with respect to peer group at a company level aggregate in the form of prompts, which are subsequently used for training the LLM and generating inferences, as illustrated in FIG. 8. The output visualization related to operational performance of insurance company with respect to peer group at a company level aggregate generated by the BI tool is rendered on the left side of the UI and summary and inference generated by the trained LLM are rendered on the right side of the UI, as illustrated in FIG. 8A.

In another exemplary embodiment of the present invention, the UI renders an output related to operational performance of insurance company with respect to peer groups in the form of prompts, which are subsequently used for training the LLM and generating inferences, as illustrated in FIG. 9. The output visualization related to operational performance of insurance company with respect to peer groups generated by the BI tool is rendered on the left side of the UI and summary and inference generated by the trained LLM are rendered on the right side of the UI, as illustrated in FIG. 9A.

In another exemplary embodiment of the present invention, the UI renders an output related to operational performance of insurance company with respect to peer group in the form of prompts, which are subsequently used for training the LLM and generating inferences, as illustrated in FIG. 10. The output visualization related to operational performance of insurance company with respect to peer group generated by the BI tool is rendered on the left side of the UI and summary and inference generated by the trained LLM are rendered on the right side of the UI, as illustrated in FIG. 10A.

In another exemplary embodiment of the present invention, the UI renders an output related to coverage level operational performance across peer groups in the form of prompts, which are subsequently used for training the LLM and generating inferences, as illustrated in FIG. 11. The output visualization related to coverage level operational performance across peer groups generated by the BI tool is rendered on the left side of the UI and summary and findings generated by the trained LLM are rendered on the right side of the UI, as illustrated in FIG. 11A.

In yet another exemplary embodiment of the present invention, the UI renders an output related to determining performance of companies of similar size with respect to each other in the form of prompts, which are subsequently used for training the LLM and generating inferences, as illustrated in FIG. 12. The output visualization related to determining performance of companies of similar size generated by the BI tool is rendered on the UI, as illustrated in FIG. 12A and summary and inferences generated by the trained LLM are rendered on the right side of the UI, as illustrated in FIG. 12B.

In an embodiment of the present invention, the data visualization unit 120 generates and renders a conversational UI, which the user may access for providing queries with respect to the organizational parameters, as illustrated in FIG. 13. The data visualization unit 120 in communication with the LLM unit 126, by employing the LLMs, provides answers to one or more user queries along with targeted remedial initiatives depending on the problem areas associated with the organizational parameters. The one or more user queries may include, but are not limited to, performance of the organization with respect to the one or more parameters, query regarding actions being taken by similar organizations, and remedial initiatives taken. The data visualization unit 120 in communication with the LLM unit 126 generates advisory reports, as illustrated in FIG. 13A, along with a magnitude of remedial impact for helping organizations undertake remedial decisions.

FIGS. 14 and 14A illustrate a flowchart depicting a method for providing an improved end-to-end generative artificial intelligence-based data analytics tool, in accordance with an embodiment of the present invention.

At step 1402, a large amount of data is collected from multiple data sources. In an embodiment of the present invention, the multiple data sources are located at disparate locations. The data sources may include, but are not limited to, data files, databases associated with various organizations, historical data, websites, communication applications, and social media. The data collected is in multiple formats such as structured data format and unstructured data format. The structured data is in a pre-defined format such as in the form of tables with well-defined columns. The unstructured data is in varied and divergent formats such as published reports, news articles analysis provided by organizations, and interview transcripts of organization's executives. In an example, if the organization relates to an insurance domain, then the structured data collected includes, but is not limited to, organization name, NAIC organization number, state of domicile, year of incorporation, coverage code, coverage description, premiums written (NPW), premiums earned (NPE), dividend paid to policy holders, losses incurred, loss adjustment expenses, unpaid losses, broker expenses, tax and license fee incurred, investment gains, total profit/loss, losses incurred to NPE, losses and loss adjustment expense incurred to NPE, total underwriting expense incurred to NPW, and combined ratio.

In another example, the unstructured data related to the organization includes, but is not limited to, documents providing details of target focus areas for operational performance improvement, recommended IT initiatives based on the focus areas for operational performance improvement, projected impact on target objectives based on the recommended IT initiatives, validated list of third-party providers associated with technology expertise, technology trends in industry, performance improvement initiatives taken by peer group companies, perspectives on innovation and research, financial performance reports, earnings call transcripts, inputs from industry leaders on organizational outlook, peer group performance comparison, and best practices. In an embodiment of the present invention, a reference tag associated with the data source is fetched along with collected data for providing integrity and traceability of the collected data. In an exemplary embodiment of the present invention, the data from disparate sources is consolidated by using a storage service tool such as Amazon Web Services® (AWS) Simplified Storage Service (S3) in the form of buckets. In an embodiment of the present invention, privacy enhancing techniques are employed for carrying out data masking and data encryption to protect data during processing and usage.

In an embodiment of the present invention, a data quality assessment is performed based on one or more pre-determined criteria for ensuring quality of the collected data. The one or more pre-determined criteria associated with the quality of the collected data includes, but are not limited to, completeness of the collected data comprising diverse and comprehensive range of data scenarios, accuracy of the collected data including updated and representative data, accurate timeliness associated with the collected data providing age of data in the data sources, consistency of the collected data including maintaining coherence and consistency in the data life cycle, and data lineage including tracking of the data sources and applicable license restrictions.

At step 1404, one or more data elements from the collected data are extracted for ingestion and storage. In an embodiment of the preset invention, one or more data elements are extracted from the collected data relating to structured data format and the unstructured data format for loading and ingesting the extracted data. The data elements relate to relational data associated with the structured data format and non-relational data associated with the unstructured data format. The one or more data elements associated with the collected data are loaded and ingested based on the type of data format. In an exemplary embodiment of the present invention, the data elements extracted from the structured data format are loaded into database tables for ingestion. In an embodiment of the present invention, an Optical Character Recognition (OCR) technique is implemented for recognizing one or more variables associated with the data elements from the data present in the unstructured format based on predefined tags and rules. The extracted data elements are stored in database tables along with the structured data elements for ingestion.

At step 1406, one or more data transformation operations are implemented on the ingested and stored data for transforming the data. In an embodiment of the present invention, the data transformation operations include, but are not limited to, data cleaning, data validating, and data enrichment. The data transformation operation be performed manually or may automatically. Further, the data transformation operation is implemented by determining the data, mapping modifications in the data, extracting data, transforming data, reviewing the transformed data, and storing the transformed data. The data transformation operation transforms the data into a structured, uniformly formatted, accessible, understandable, and actionable form for analysis. In an exemplary embodiment of the present invention, the transformed relational data is stored into Microsoft PowerBI® tool and non-relational data is stored into Azure® AI vector database for subsequent data processing and creation of visualizations. Further, user level access permissions are defined at this level. One or more data security operations are performed including, but are not limited to, organizing and labelling data, encrypting data, providing access controls, and setting up audit logging.

In an embodiment of the present invention, a data tracking operation is performed during data storage based on pre-determined data tracking parameters including, but is not limited to, recording data source name and data collection date. The data source name is providing recorded by data source citation and documentation of data origins through cataloguing. A reference to origin of datasets, databases and other data sources is maintained along with the stored data. The data tracking operation is performed for tracking data origin (such as URLs, third party reports, etc.), details of data collection process (such as via emails, websites, social media, etc.), and the data transformation operations (such as transformation logic). The visualizations and inferences presented on the UI renders data source references at the bottom of the UI screen. In another embodiment of the present invention, one or more LLMs are employed for processing pre-defined prompt queries that are executed offline to provide tracking of data sources.

In another embodiment of the present invention, continuous monitoring of data sources is carried out as the data sources get periodically refreshed with time. For example, financial performance reports get updated every quarter or year and recommendations on technology initiatives are made to improve performance. In an embodiment of the present invention, refreshing of data is initiated periodically to collect current and up-to-date data from data sources. In an embodiment of the present invention, the LLM is retrained along with refreshing of data and the pre-determined data tracking parameters are also refreshed. In an exemplary embodiment of the present invention, an audit report is generated at regular intervals for providing various data sources along with URLs, author names and ingestion dates for periodic traceability compliance checks and sign-off by auditors.

At step 1408, the transformed version of the collected data is processed for analyzing one or more data parameters associated with the transformed data to determine relationships and patterns within the transformed data. In an embodiment of the present invention, the transformed version of the collected data is processed by implementing one or more statistical and logical techniques. In an example, one or more primary metrics associated are computed to quantify relationship between underlying variables.

In another exemplary embodiment of the present invention, one or more visual outputs and inferences are generated by analyzing the one or more primary metrics associated with organizations operational aspects and may include, but are not limited to, performance summary of an organization, growth of the organization, organization's operational data, organization's operational deficiencies, comparison of an organization's operations and performance with respect to other peer group organizations and broader industry, and IT initiatives to be implemented for improving efficiency of the organization's operation.

At step 1410, one or more prompts related to one or more user queries are generated and the user queries are converted into one or more tokens and the transformed data is associated with one or more tokens. In an embodiment of the present invention, one or more user inputs are received in the form of user queries via the UI for generating one or more prompts. The user queries relate to determining one or more operational parameters associated with the organization. The user queries are converted into one or more tokens by implementing a tokenization operation. The transformed data (comprising the structured and unstructured data) is fetched and associated with the tokens by employing a Retrieval Augmented Generation (RAG) technique. The RAG technique combines the LLM's capabilities with the external data sources to generate a more informed and contextually rich response and aids in generating impactful prompts for the user queries that require real-time data or domain specific expertise to be incorporated into the LLM. In an exemplary embodiment of the present invention, the prompts may be related to investigation of operational performance issues of an organization, the underlying root causes and potential remedial actions needed and are used to train the LLMs.

In an embodiment of the present invention, the generated prompts are associated with one or more pre-determined prompt elements including, but are not limited to, instructions, context, output indicator and expected output with respect to the one or more operational parameters associated with the operational performance of the organization. The prompts along with the prompt responses are provided to the LLMs as an input for training the LLMs and generating one or more outputs including, but are not limited to, one or more diagnostics data, patterns related to causes of performance issues, insights related to operational efficiencies of the organization and potential remedial actions to improve the organization's performance. In an exemplary embodiment of the present invention, the prompt generation techniques used for training the LLM include, but are not limited to, a zero-shot prompting technique in which a task is provided to the LLM without providing examples or explicit training for that specific task, thereby relying fully on LLM's knowledge, a few-shots prompting technique in which examples of a task are provided to the LLM to guide the output, a chain of thought prompting technique in which the task is divided into a sequence of reasoning steps providing structure and coherence to generated output, a negative prompting technique in which explicit instructions are provided to the LLM regarding what not to include in its response to avoid unwanted content, thereby maintaining focus and enhancing clarity in output.

In an embodiment of the present invention, prior to generation of prompts, vector embeddings are generated to capture specific and relevant domain knowledge from the data sources. The vector embeddings are used to enhance the user inputs provided as queries to generate an augmented and enriched prompt comprising data from the data sources. In an exemplary embodiment of the present invention, the vector embeddings are generated by using tools such as text split skill to break each external data source into multiple smaller chunks and then the chunks are parsed. Each chunk comprises text, images or audio. Further, each vector embedding is an array of numerical values consisting of a token ID number and a token name. The generated vector embeddings have a high dimensionality to capture user behavioral features such as semantic meaning, role and sentiment. In an embodiment of the present invention, a vector database (now shown) is generated for storing the vector embeddings, which is dynamic in nature and is refreshed either manually or automatically at regular intervals of time whenever the data sources are updated. In an exemplary embodiment of the present invention, the vector databases may include, but are not limited to, Azure AI Search, Amazon OpenSearch Service, Pinecone, Mongo DB, Amazon Redis, and Amazon RDS for PostgreSQL. Advantageously, the vector embeddings effectively parse various data sources to efficiently capture the data specific nuances such as, target focus areas for operational performance improvement, recommended IT initiatives based on target focus areas, projected impact on operational metrics based on suggested IT initiatives, validated lists of third-party vendors for niche technology partners and Commercial-Off-The-Shelf (COTS) packaged products, technology trends for the specific organization, IT initiatives being adapted among peer group organizations, innovation and state-of-the-art research findings from collaboration with academic institutions, reports from reputed industry bodies, expert inputs and perspectives related to organization's vision, and best practices from peer group performance comparison.

In an embodiment of the present invention, the vector embeddings are used for generating intelligent prompts by using one or more prompt generation techniques and one or more prompt generation templates. In an embodiment of the present invention, prompt generation techniques include, but are not limited to, an unsupervised learning technique and a semi-supervised learning technique to develop, generate and optimize prompts to enhance output of the LLM. Further, the prompt templates are employed to simplify and standardize the generation of the prompts. The prompt template comprises at least four prompt elements including "instructions" providing description of the organizational parameter and how the LLM should perform, "context" with data needed to guide the LLM, "input data" for which a response is needed, and an "output indicator" providing the output type or format. Further, the prompt elements may be selected optionally depending upon the nature and purpose of the prompt.

In an exemplary embodiment of the present invention, the generated prompts are classified based on the intent, including, but not limited to, "descriptive type prompts", "diagnostic type prompts" and "prescriptive type prompts". The "descriptive type prompts" are generated and developed to determine an exact response describing the performance of the organization in terms of various primary metrics and inferences and summarizes data quantitatively by statically presenting the data. The "diagnostic type prompts" are generated and developed to determine causes related to organizational performance issues. The "prescriptive type prompts" are generated and developed to provide recommendations for resolving the organizational performance issues. The generated prompts are relevant to the organization's domain which effectively customizes and trains the LLMs to generate more relevant and accurate responses specific to the organization's context and issues. The prompts are developed, generated, and optimized to enhance the output of LLMs for efficiently determining trends, correlations, patterns, outliers, and variations associated with the transformed data. The correlations, patterns, outliers, and variations associated with data are determined by using one or more data analysis techniques, such as, but are not limited to, a descriptive analysis technique, a diagnostic analysis technique, a predictive analysis technique, and a prescriptive analysis technique.

At step 1412, the prompts are processed by using trained LLMs for generating an output with respect to operational issues. In an embodiment of the present invention, the LLMs are trained using the generated prompts for generating the output comprising recommendations relating to the diagnostic data and insights with respect to the organization's operational issues. In an embodiment of the present invention, performance of the LLMs is improved for enhancing the response quality of the LLMs by employing modifiable prompt parameters that control the randomness and diversity of output provided by the LLMs. The prompt parameters may include, but are not limited to, system prompts, temperature parameter, top P parameter, top K parameter, length of the prompt, and stop sequences of the prompt. The "system prompts" indicate working of the LLM based on assuming role or actor persona by the LLM for processing the specific prompt, the "temperature" parameter determines creativity of the LLM output and is in a range of 0 to 1, as such a higher value of temperature output leads to more creative LLM output, the "top P" parameter determines percentage of similar words in the prompt and is in a range of 0 to 1, and as such higher value of "top P" parameter leads to a more diverse outputs from the LLM, the "top K" parameter determines number of probable words in the prompt and as such a lower value of top K" parameter leads to a coherent output from the LLM, the "length" parameter determines maximum length of output from the LLM and the "stop sequences" parameter signal the LLM to stop generating the outputs. In an embodiment of the present invention, an optimal value of the prompt parameters is determined based on iterative testing of various prompts and generated responses and optimal values of the prompt parameters are used for customizing the LLMS for generating accurate, context rich and domain relevant LLM responses.

In an embodiment of the present invention, effectiveness of LLM training is computed by determining performance of the LLM based on one or more LLM variables including, but are not limited to, LLM accuracy, precision, recall, F1 score, and latency. The "LLM accuracy" variable provides ratio of positive predictions to total predictions. The "precision" variable indicates the ratio of true positive predictions of the LLMs (i.e., correct vs incorrect positive predictions). The "recall" parameter computes ratio of true positive predictions of the LLMs as compared to the actual positive predictions. The "F1 score" variable determines average of "precision" variable and "recall" variable for a suitable measure. The "latency" variable computes time taken by the LLM to generate the response.

At step 1414, one or more recommendations are provided for resolving the operational issues based on processing of the prompts. In an embodiment of the present invention, the one or more organizational specific recommendations are provided based on processing of the prompts associated with the diagnostic data and insights for resolving the operational issues of the organization for increasing and optimizing operational efficiency of the organizations. The recommendations may include, but are not limited to, organization's performance analysis, advisory summary and recommendations of target focus areas.

At step 1416, the prompts and recommendations are visualized. In an embodiment of the present invention, the generated prompt elements associated with the prompts are visualized via the output 122. Visualization of unit recommendations relating to the diagnostic data and insights generated is provided by processing the prompts via the output unit 122. Also, visualization of the one or more organizational specific recommendations relating to the diagnostic data and insights are provided for increasing and optimizing operational efficiency of the organizations.

In an embodiment of the present invention, comprehensive visualization of the one or more organizational parameters are provided in one or more visualization forms such as, charts, graphs, maps, pie charts, bar charts, histograms, line graphs and dashboards on a User Interface (UI) by using BI tools and a visualization tool. Examples of visualization tools include, but are not limited to, Microsoft PowerBI®, Tableau®, Cognos®, Jupyter®, and Amazon QuickSight®. In another embodiment of the present invention, inference for each organizational parameter is provided in the form of summary and observations by processing the visualization forms associated with the organization's operational performance metrics. In an exemplary embodiment of the present invention, Microsoft PowerBI® is used to define, create and manage various visualizations. One or more components associated with the Microsoft PowerBI® includes a powerBI desktop, a power BI gateway, a power query editor, a power BI service and a power BI report server. The powerBI desktop component is used to connect various data sources and export external data into the subsystem 102 to generate reports and to visualize data. The powerBI desktop component has native connectors for various types of external data sources, including flat files, databases, online applications and services. Further, data sources are configured and connected to export data by using "get data" option on the powerBI desktop interface. The powerBI gateway component is used as a bridge for connecting the powerBI service to on-premises data sources. The powerBI query editor component is used to perform various data aggregations and calculations for visualizations. Further, powerBI desktop's capabilities are leveraged to create one or more data visualization types such as charts, graphs, tables, etc. and to highlight the important insights from such visualizations. Further, the UI is split into multiple "tiles" to provide data visualization types. The visualizations rendered by powerBI desktop are accessed using the powerBI service over the cloud for accessing from any location through a web browser. PowerBI report server is used as a central repository to manage all the visualizations and to track the primary metrics associated with organization's performance.

Advantageously, in accordance with various embodiments of the present invention, the present invention provides improved data analytics for providing organizational specific recommendations by employing GenAI techniques and LLMs. The present invention provides for uniformly analyzing and processing a large amount of data from multiple sources and of different formats. The present invention provides for end-to-end data analytics tool which covers diagnostics to recommendations for organizational related issues by implementing LLMS. The present invention provides for determining complex relationships and patterns between large datasets for providing diagnostics and recommendations with respect to organizational issues. Further, the present invention provides for efficient visualizations and on-demand customizable dashboards for deep-dive and analysis, along with GenAI based chat interface. Furthermore, the present invention provides for generating intelligent summaries and inferences related to organizational issues by processing multiple organizational parameters and suggesting remedial actions based on reference data sources by employing LLMs.

FIG. 15 illustrates an exemplary computer system 1502 in which various embodiments of the present invention may be implemented. The computer system 1502 comprises a processor 1504 and a memory 1506. The processor 1504 executes program instructions and is a real processor. The computer system 1502 is not intended to suggest any limitation as to scope of use or functionality of described embodiments. For example, the computer system 1502 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1506 may store software for implementing various embodiments of the present invention. The computer system 1502 may have additional components. For example, the computer system 1502 includes one or more communication channels 1508, one or more input devices 1510, one or more output devices 1512, and storage 1514. An interconnection mechanism (not shown) such as a bus, controller, or network, interconnects the components of the computer system 1502. In various embodiments of the present invention, operating system software (not shown) provides an operating environment for various software executing in the computer system 1502 and manages different functionalities of the components of the computer system 1502.

The communication channel(s) 1508 allows communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 1510 may include, but not limited to, a keyboard, mouse, pen, joystick, trackball, a voice device, a scanning device, touch screen or any another device that is capable of providing input to the computer system 1502. In an embodiment of the present invention, the input device(s) 1510 may be a sound card or similar device that accepts audio input in analog or digital form. The output device(s) 1512 may include, but not limited to, a user interface on CRT or LCD, printer, speaker, CD/DVD writer, or any other device that provides output from the computer system 1502.

The storage 1514 may include, but not limited to, magnetic disks, magnetic tapes, CD-ROMs, CD-RWs, DVDs, flash drives or any other medium which can be used to store information and can be accessed by the computer system 1502. In various embodiments of the present invention, the storage 1514 contains program instructions for implementing the described embodiments.

The present invention may suitably be embodied as a computer program product for use with the computer system 1502. The method described herein is typically implemented as a computer program product, comprising a set of program instructions which is executed by the computer system 1502 or any other similar device. The set of program instructions may be a series of computer readable codes stored on a tangible medium, such as a computer readable storage medium (storage 1514), for example, diskette, CD-ROM, ROM, flash drives or hard disk, or transmittable to the computer system 1502, via a modem or other interface device, over either a tangible medium, including but not limited to optical or analogue communications channel(s) 1508. The implementation of the invention as a computer program product may be in an intangible form using wireless techniques, including, but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A generative artificial intelligence-based system for providing an improved end-to-end data analytics tool, the system comprising:

a memory storing program instructions;

a processor executing program instructions stored in the memory; and a data analytics engine executed by the processor and configured to:

collect data from input units associated with multiple data sources located at disparate locations, wherein a data quality assessment is performed based on one or more pre-determined criteria;

transform the collected data using one or more data transformation operations based on the data quality assessment;

determine relationships and patterns within the transformed data by analyzing one or more data parameters associated with the transformed data;

generate prompts related to operational issues associated with a specific domain using one or more prompt generation techniques and one or more prompt generation templates based on the determined relationships and patterns within the transformed data, wherein the prompts are provided to a Large Language Models (LLM) as an input for generating outputs comprising diagnostic data and insights related to the operational issues;

generate one or more domain specific recommendations by the LLM based on the generated outputs for resolving the operational issues; and determine an optimal value of one or more modifiable prompt parameters associated with the generated prompts based on an iterative testing of the prompts and the generated outputs for customizing the LLM to generate the outputs relevant to the specific domain.

2. The system as claimed in claim 1, wherein the collected data is present in multiple formats comprising structured data format and unstructured data format, and wherein a reference tag associated with each of the multiple data sources is fetched by a data collection unit along with collected data for providing integrity and traceability of the collected data.

3. The system as claimed in claim 2, wherein a data analytics engine comprises a data loading and ingestion unit executed by a processor and is configured to extract one or more data elements from the collected data relating to the structured data format and the unstructured data format for loading and ingesting the extracted data, the one or more data elements associated with the collected data are loaded and ingested in a pre-determined data format.

4. The system as claimed in claim 3, wherein the data analytics engine comprises a data transformation and storage unit executed by the processor and configured to implement the one or more data transformation operations on the ingested data for transforming the collected data, and wherein the one or more data transformation operations comprise data cleaning, data validating, and data enrichment, and wherein the one or more data transformation operations are implemented by determining data associated with the specific domain, mapping modifications in the data, extracting data, transforming data, reviewing the transformed data, and storing the transformed data.

5. The system as claimed in claim 4, wherein the data transformation and storage unit performs a data tracking operation during data storage based on pre-determined data tracking parameters comprising recording data source name and data collection date, and wherein the data tracking operation is performed for tracking data origin, and details of data collection process, and the implemented one or more data transformation operations, and wherein the data transformation and storage unit employs one or more LLMs by communicating with an LLM unit for processing one or more pre-defined prompt queries that are executed offline to provide tracking of the multiple data sources.

6. The system as claimed in claim 5, wherein the data transformation and storage unit carries out continuous monitoring of the multiple data sources, and wherein refreshing of data is initiated periodically by the data transformation and storage unit to collect current and up-to-date data from the multiple data sources, and wherein the LLM is retrained along with refreshing of the data and the pre-determined data tracking parameters.

7. The system as claimed in claim 1, wherein the data analytics engine comprises a data processing and analysis unit executed by the processor and configured to transform the collected data and determine the relationships and the patterns within the transformed data by implementing one or more statistical and logical techniques.

8. The system as claimed in claim 1, wherein the data analytics engine comprises a prompt generation unit executed by the processor and configured to receive one or more user inputs in the form of user queries from an input unit for generating the prompts based on the user queries, the user queries relate to determining one or more operational parameters, wherein the prompt generation unit converts the user queries into one or more tokens by implementing a tokenization operation, and wherein the prompt generation unit fetches the transformed data from a data processing and analysis unit and associates the transformed data with the generated tokens by employing a Retrieval Augmented Generation (RAG) technique.

9. The system as claimed in claim 8, wherein the prompts along with one or more prompt responses are provided to the LLMs associated with a LLM unit as an input by the prompt generation unit for training the LLM and generating one or more outputs comprising one or more diagnostics data, determining patterns related to causes of performance issues, generating insights related to operational efficiencies and potential remedial actions to improve performance.

10. The system as claimed in claim 8, wherein the prompt generation unit generates one or more vector embeddings to capture specific and relevant domain knowledge from the multiple data sources, the one or more vector embeddings are used to enhance the one or more user inputs provided as the user queries to generate an augmented and enriched prompt comprising data from the multiple data sources, and wherein each of the one or more vector embeddings is an array of numerical values comprising a token ID number and a token name, the vector embeddings captures user behavioral features comprising semantic meaning, role and sentiment.

11. The system as claimed in claim 10, wherein the prompt generation unit processes the one or more vector embeddings to:

generate the prompts by using the one or more prompt generation techniques and the one or more prompt generation templates, the prompt generation techniques comprises an unsupervised learning technique and a semi-supervised learning technique to develop;

generate and optimize prompts to enhance output of the LLM, and wherein the one or more prompts generation templates are associated with pre-determined prompt elements comprising instructions, context, output indicator, and expected output with respect to the one or more operational parameters, the prompt elements are selected optionally depending upon the nature and purpose of the prompt.

12. The system as claimed in claim 11, wherein the prompt generation unit develops, generates, and optimizes prompts to enhance output of the LLMs for determining trends, correlations, patterns, outliers, and variations associated with the transformed data, and wherein the correlations, patterns, outliers, and variations associated with the collected data are determined by using one or more data analysis techniques, comprising a descriptive analysis technique, a diagnostic analysis technique, a predictive analysis technique, and a prescriptive analysis technique.

13. The system as claimed in claim 1, wherein the data analytics engine comprises a LLM unit executed by the processor and configured to receive the generated prompts from a prompt generation unit, and wherein the LLMs associated with the LLM unit are trained using the prompts for generating the diagnostic data and insights with respect to the one or more operational issues, and wherein the LLM unit provides the one or more domain specific recommendations relating to the diagnostic data and insights based on the generated prompts.

14. The system as claimed in claim 13, wherein the LLM unit improves performance of the LLMs for enhancing response quality of the LLMs by employing the one or more modifiable prompt parameters that control the randomness and diversity of output provided by the LLMs, and wherein the LLM unit determines the optimal value of the one or more modifiable prompt parameters based on the iterative testing of various prompts and generated responses, and the optimal value of the one or more modifiable prompt parameters are used for customizing the LLMs for generating accurate, context rich and domain relevant LLM responses.

15. The system as claimed in claim 1, wherein the data analytics engine comprises a data visualization unit executed by the processor and configured to receive the generated prompts from a prompt generation unit for providing visualization of one or more prompt elements associated with the prompts via an output unit, and wherein the data visualization unit provides visualization of the one or more domain specific recommendations relating to diagnostic data and insights generated by a LLM unit by processing the prompts, and wherein the data visualization unit provides visualization of the one or more domain specific recommendations for resolving operational issues via the output unit.

16. The system as claimed in claim 15, wherein the data analytics engine comprises a data visualization unit configured to provide visualization of the one or more operational parameters in one or more visualization forms comprising charts, graphs, maps, pie charts, bar charts, histograms, line graphs and dashboards on a Graphical User Interface (UI) associated with the output unit by using one or more Business Intelligence (BI) tools and a visualization tool.

17. The system as claimed in claim 16, wherein the data visualization unit communicates with thea LLM unit for providing inference for each of the one or more operational parameters in the form of summary and observations by processing the one or more visualization forms associated with the one or more operational parameters.

18. The system as claimed in claim 16, wherein the data visualization unit in communication with the LLM unit provides answers to one or more user queries along with targeted remedial initiatives depending on a problem area associated with the operational parameters, and wherein the data visualization unit in communication with the LLM unit generates advisory reports along with a magnitude of remedial impact for generating remedial decisions.

19. A generative artificial intelligence-based method for providing an improved end-to-end data analytics tool, the method is implemented by a processor executing instructions stored in a memory, the method comprises:
    collecting data from input unit(s) associated with multiple data sources located at disparate locations, wherein a data quality assessment is performed based on one or more pre-determined criteria;
    transforming the collected data using one or more data transformation operations based on the data quality assessment;
    determining relationships and patterns within the transformed data by analyzing one or more data parameters associated with the transformed data;
    generating prompts related to operational issues associated with a specific domain using one or more prompt generation technique and one or more prompt generation templates based on the determined relationships and patterns within the transformed data, wherein the prompts are provided to a Large Language Models (LLMs) as an input for generating outputs comprising diagnostic data and insights related to the operational issues,
    generating one or more domain specific recommendations by the LLM based on the generated outputs for resolving the operational issues; and
    determining an optimizal value of one or more modifiable prompt parameters associated with the generated prompts based on an iterative testing of the prompts and the generated outputs for customizing the LLM to generate the outputs relevant to the specific domain.

20. The method as claimed in claim 19, wherein the one or more data transformation operations are implemented on the ingested data for transforming the collected data, and wherein the one or more data transformation operations comprise data cleaning, data validating, and data enrichment, and wherein the one or more data transformation operations are implemented by determining the data associated with the specific domain, mapping modifications in the data, extracting data, transforming data, reviewing the transformed data, and storing the transformed data.

21. The method as claimed in claim 20, wherein a data tracking operation is performed during data storage based on pre-determined data tracking parameters comprising recording data source name and data collection date, and wherein the data tracking operation is performed for tracking data origin, details of data collection process, and the data transformation operations, and wherein one or more LLMs are employed for processing one or more pre-defined prompt queries that are executed offline to provide tracking of the multiple data sources.

22. The method as claimed in claim 19, wherein one or more user inputs in the form of user queries are used for generating the prompts related to one or more user queries, wherein the user queries relate to determining one or more operational parameters, the user queries are converted into one or more tokens by implementing a tokenization operation, and wherein the transformed data is associated with the tokens by employing a Retrieval Augmented Generation (RAG) technique.

23. The method as claimed in claim 22, wherein the prompts along with one or more prompt responses are provided to the LLMs as an input for training the LLM and generating one or more outputs comprising one or more diagnostics data, determining patterns related to causes of performance issues, generating insights related to operational efficiencies and potential remedial actions to improve performance.

24. The method as claimed in claim 23, wherein one or more vector embeddings are generated to capture specific and relevant domain knowledge from the multiple data sources, the one or more vector embeddings are used to enhance the one or more user inputs provided as the user queries to generate an augmented and enriched prompt comprising data from the multiple data sources, and wherein each of the one or more vector embeddings is an array of numerical values comprising a token ID number and a token name, the vector embeddings captures user behavioral features comprising semantic meaning, role and sentiment.

25. The method as claimed in claim 24, wherein the one or more vector embeddings are processed for:
    generating the prompts by using the one or more prompt generation techniques and the one or more prompt generation templates, the prompt generation techniques comprise an unsupervised learning technique and a semi-supervised learning technique to develop,
    generate, and optimize prompts to enhance output of the LLM, and wherein the one or more prompts generation templates are associated with pre-determined prompt elements comprising instructions, context, output indicator, and expected output with respect to the one or more operational parameters, the prompt elements are selected optionally depending upon the nature and purpose of the prompt.

26. The method as claimed in claim 25, wherein performance of the LLM is improved for enhancing response quality of the LLM by employing the one or more modifiable prompt parameters that control the randomness and diversity of output provided by the LLM, and wherein the optimal value of the one or more modifiable prompt parameters is determined based on the iterative testing of various prompts and generated responses, and the optimal values of the one or more modifiable prompt parameters are used for customizing the LLM for generating accurate, context rich and domain relevant LLM responses.

27. The method as claimed in claim 19, wherein one or more prompt elements associated with the prompts are visualized, and wherein the visualization of the one or more domain specific recommendations relating to diagnostic data and insights is generated by processing the prompts, and wherein the one or more domain specific recommendations for resolving operational issues is visualized.

28. The method as claimed in claim 27, wherein answers to one or more user queries are provided along with targeted remedial initiatives depending on a problem area associated with the operational parameters, and wherein advisory reports are generated along with a magnitude of remedial impact for generating remedial decisions.

29. A computer program product comprising:

a non-transitory computer-readable medium having computer program code stored thereon, the computer-readable program code comprising instructions that, when executed by a processor, causes the processor to:

collect data from input unit(s) associated with multiple data sources located at disparate locations, wherein a data quality assessment is performed based on one or more pre-determined criteria;

transform the collected data using one or more data transformation operations based on the data quality assessment;

determine relationships and patterns within the transformed data by analyzing one or more data parameters associated with the transformed data;

generate prompts related to operational issues associated with a specific domain using one or more prompt generation technique and one or more prompt generation templates based on the determined relationships and patterns within the transformed data, wherein the prompts are provided to a Large Language Model (LLM) as an input for generating outputs comprising diagnostic data and insights related to the operational issues;

generate one or more domain specific recommendations by the LLM based on the generated outputs for resolving the operational issues; and determine an optimal value of one or more modifiable prompt parameters associated with the generated prompts based on an iterative testing of the prompts and the generated outputs for customizing the LLM to generate the outputs relevant to the specific domain.

\* \* \* \* \*